US012118499B2

(12) United States Patent
Bizoara

(10) Patent No.: US 12,118,499 B2
(45) Date of Patent: Oct. 15, 2024

(54) APPARATUSES, COMPUTER-IMPLEMENTED METHODS, AND COMPUTER PROGRAM PRODUCTS FOR AUTOMATIC ITEM SEARCHING AND VERIFICATION

(71) Applicant: Hand Held Products, Inc., Fort Mill, SC (US)

(72) Inventor: Manjul Bizoara, Morris Plains, NJ (US)

(73) Assignee: Hand Held Products, Inc., Charlotte, NC (US)

( * ) Notice: Subject to any disclaimer, the term of this patent is extended or adjusted under 35 U.S.C. 154(b) by 513 days.

(21) Appl. No.: 17/242,447

(22) Filed: Apr. 28, 2021

(65) Prior Publication Data

US 2021/0406544 A1 Dec. 30, 2021

(30) Foreign Application Priority Data

May 20, 2020 (IN) .............................. 202041021297

(51) Int. Cl.
*G06K 9/00* (2022.01)
*G06K 9/22* (2006.01)
(Continued)

(52) U.S. Cl.
CPC ......... *G06Q 10/083* (2013.01); *G06T 19/006* (2013.01); *G06V 10/141* (2022.01);
(Continued)

(58) Field of Classification Search
CPC .... G06Q 10/083; G06V 20/20; G06V 10/141; G06V 20/63; G06V 30/142; G06T 19/006
See application file for complete search history.

(56) References Cited

U.S. PATENT DOCUMENTS 9,595,115 B1 3/2017 Cederlof
9,632,312 B1* 4/2017 Cakmakci .......... G02B 27/0172
(Continued)

FOREIGN PATENT DOCUMENTS

WO 2019/243985 A1 12/2019

OTHER PUBLICATIONS

Do your delivery drivers need augmented reality? Scandit. (Jul. 31, 2018). Retrieved Nov. 22, 2021, from https://www.scandit.com/blog/do-your-delivery-drivers-need-augmented-reality/.
(Continued)

*Primary Examiner* — David F Dunphy
(74) *Attorney, Agent, or Firm* — Alston & Bird LLP

(57) ABSTRACT

Embodiments of the present disclosure provide for automatic item searching and verification. In example contexts, embodiments provide such functionality to improve the accuracy and efficiency of item searching during item loading and/or unloading, such as when delivering packages. Some embodiments provide for capturing an image, or set of images, identifying relevant items represented in the captured images, generating augmented reality elements associated with such relevant items, and rendering the augmented reality elements in an augmented reality environment, which can be maintained as the user continues to perform user action. Some embodiments additionally or alternatively detect improper actions based on captured image(s), and generate and provide notifications to a user for viewing.

19 Claims, 14 Drawing Sheets

(51) Int. Cl.
  *G06K 9/32* (2006.01)
  *G06Q 10/083* (2023.01)
  *G06T 19/00* (2011.01)
  *G06V 10/141* (2022.01)
  *G06V 20/20* (2022.01)
  *G06V 20/62* (2022.01)
  *G06V 30/142* (2022.01)

(52) U.S. Cl.
  CPC .............. *G06V 20/20* (2022.01); *G06V 20/63* (2022.01); *G06V 30/142* (2022.01)

(56) References Cited

U.S. PATENT DOCUMENTS

| | | | |
|---|---|---|---|
| 9,632,313 B1* | 4/2017 | Madan | G06F 3/011 |
| 9,665,960 B1* | 5/2017 | Masters | G06F 3/0485 |
| 9,798,999 B2 | 10/2017 | Schenken | |
| 10,254,548 B1 | 4/2019 | Todeschini | |
| 10,535,169 B2 | 1/2020 | Dotterweich et al. | |
| 2006/0238334 A1 | 10/2006 | Mangan et al. | |
| 2018/0029797 A1 | 2/2018 | Hance et al. | |
| 2018/0122118 A1 | 5/2018 | Dotterweich et al. | |
| 2019/0122174 A1 | 4/2019 | Gil | |

OTHER PUBLICATIONS

Extended European Search Report issued in European Application No. 21171058.7 on Oct. 25, 2021, 10 pages.

* cited by examiner

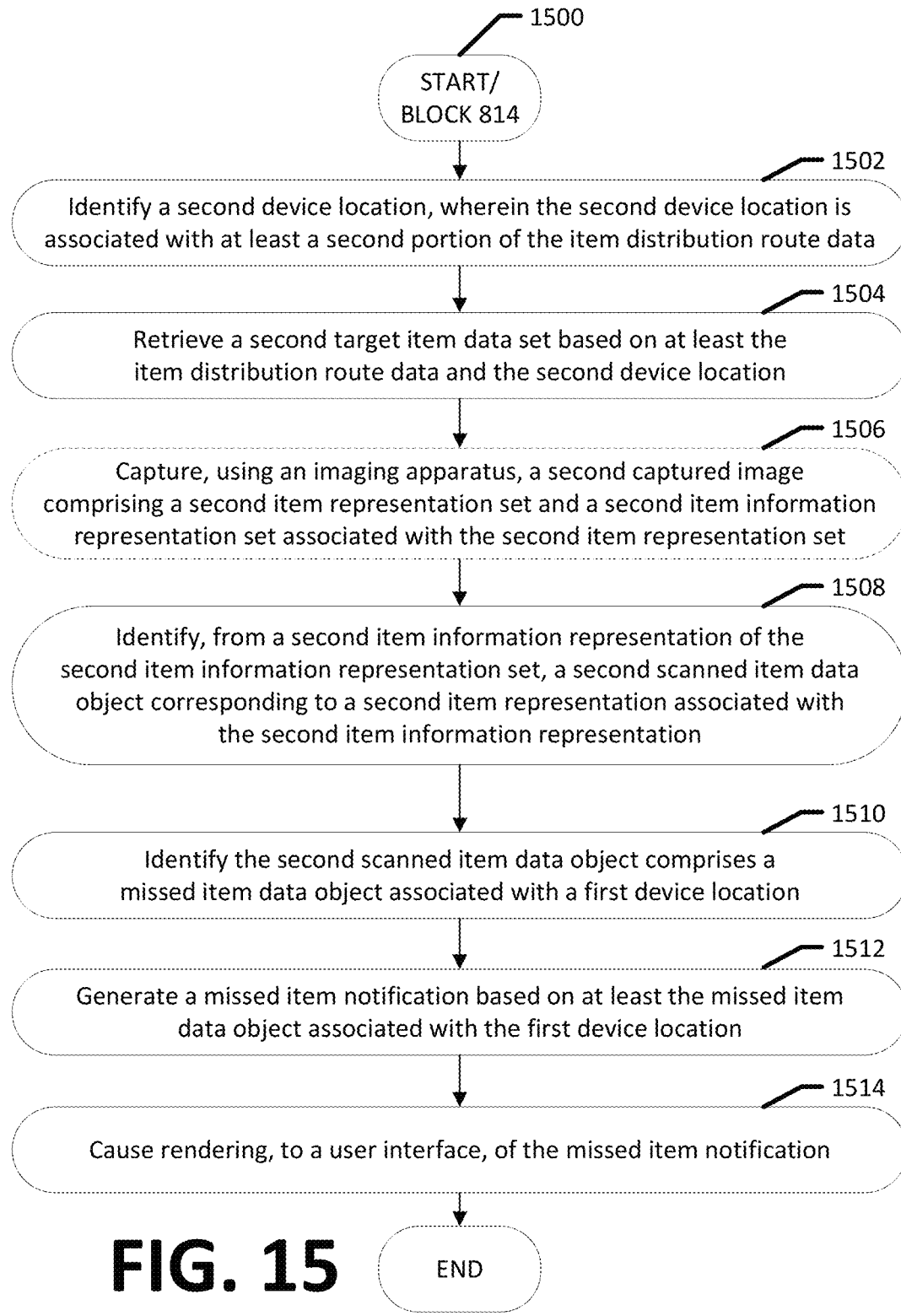

APPARATUSES, COMPUTER-IMPLEMENTED METHODS, AND COMPUTER PROGRAM PRODUCTS FOR AUTOMATIC ITEM SEARCHING AND VERIFICATION

CROSS-REFERENCE TO RELATED APPLICATIONS

This application claims priority pursuant to 35 U.S.C. 119(a) of India Patent Application No. 202041021297, filed May 20, 2020, which application is incorporated herein by reference in its entirety.

TECHNOLOGICAL FIELD

Embodiments of the present disclosure generally relate to data scanning and processing for providing augmented reality elements and corresponding notification information, and specifically to such data processing for automatic item searching and verification.

BACKGROUND

Distributing items to various locations, for example from a central hub representing a delivery hub, conventionally is a manual, human-driven process. Such a human-driven process often vulnerable to errors due to incorrect human behavior, mistakes in analysis, or the like. Such errors lead to wasted resources during item distribution. Applicant has discovered problems with current implementations for item searching and verification. Through applied effort, ingenuity, and innovation, Applicant has solved many of these identified problems by developing embodied in the present disclosure, which are described in detail below.

BRIEF SUMMARY

In general, embodiments of the present disclosure provided herein provide for automatic item searching and verification. Other implementations for automatic item searching and verification will be, or will become, apparent to one with skill in the art upon examination of the following figures and detailed description. It is intended that all such additional implementations be included within this description be within the scope of the disclosure, and be protected by the following claims.

In accordance with one aspect of the disclosure, a computer-implemented method for automatic item searching and verification is provided. The computer-implemented method may be performed via one or more devices, apparatuses, computer program products, and/or the like, as described herein. For example, the computer-implemented method in some embodiments is performed via an imaging apparatus and/or user device communicable with an imaging apparatus. In an example embodiment, the computer-implemented method includes retrieving a target item data set associated with item distribution route data. The example computer-implemented method further includes receiving a captured image comprising an item representation set and an item information representation set associated with the item representation set, wherein each item representation of the item representation set is associated with an item position in an augmented reality environment. The example computer-implemented method further includes identifying, from an item information representation of the item information representation set, a scanned item data object corresponding to the item information representation. The example computer-implemented method further includes determining that the scanned item data object comprises a relevant item data object based on at least the target item data set. The example computer-implemented method further includes generating an augmented reality element corresponding to the relevant item data object. The example computer-implemented method further includes causing rendering, to a user interface, of the captured image augmented based on at least the augmented reality element, wherein the augmented reality element is rendered based on at least a first item position associated with an item representation corresponding to the augmented reality element.

Additionally or alternatively, in some example embodiments of the computer-implemented method, receiving the captured image comprises capturing at least the captured image using an imaging apparatus.

Additionally or alternatively, in some example embodiments of the computer-implemented method, the computer-implemented method further comprises identifying, from a second item information representation of the item information representation set, a second scanned item data object corresponding to a second item representation associated with the second item information representation; identifying the second scanned item data object comprises a second relevant item data object based on at least the target item data set associated with the item distribution route data, wherein the second relevant item data object corresponds to the second item representation; generating a second augmented reality element corresponding to the second relevant item data object; and causing rendering, to the user interface, of the captured image augmented based on at least the second augmented reality element, wherein the second augmented reality element is rendered based on a second item position associated with the second item representation corresponding to the second augmented reality element.

Additionally or alternatively, in some example embodiments of the computer-implemented method, identifying the scanned item data object corresponding to the item information representation comprises detecting a visual indicia in the captured image; and decoding the visual indicia to identify the scanned item data object.

Additionally or alternatively, in some example embodiments of the computer-implemented method, identifying the scanned item data object corresponding to the item information representation comprises detecting an item label in the captured image; and extracting, using an optical character recognition image processing algorithm, the scanned item data object.

Additionally or alternatively, in some example embodiments of the computer-implemented method, the computer-implemented method further comprises capturing, using an imaging apparatus, a second captured image set comprising a second visual indicia set; decoding, from the second visual indicia set, a second scanned item data set associated with the second visual indicia set, the second scanned item data set representing a loaded item data set; identifying, based on at least the second scanned item data set, an undetected relevant item data object; generating an undetected relevant item notification based on at least the undetected relevant item data object; and causing rendering, to the user interface, of the undetected relevant item notification.

Additionally or alternatively, in some example embodiments of the computer-implemented method, the computer-implemented method further comprises capturing, using an imaging apparatus, a second captured image set comprising a second visual indicia set; decoding, from the second visual indicia set, a second scanned item data set associated with the second visual indicia set, wherein the second scanned item data set represents a loaded item data set; detecting, from the scanned item data set, an improper item data object based on at least the target item data set; generating an improper scanned item notification based on at least the improper item data object; and causing rendering, to the user interface, of the improper scanned item notification.

Additionally or alternatively, in some example embodiments of the computer-implemented method, the computer-implemented method further comprises identifying a device location, wherein retrieving the target item data set is based on at least the device location.

Additionally or alternatively, in some example embodiments of the computer-implemented method, the computer-implemented method further comprises identifying a device location, wherein the device location is associated with at least a portion of the item distribution route data; retrieving a second target item data set based on the item distribution route data and the device location, the second target item data set representing a target unload data set; capturing, using an imaging apparatus, a second captured image comprising a second item representation set and a second item information representation set associated with the second item representation set, wherein each item representation in the second item representation set is associated with a second item position in a second augmented reality environment; identifying, from a second item information representation of the item information representation set, a second scanned item data object corresponding to the second item information representation; identifying the second scanned item data object comprises a second relevant item data object based on at least the second target item data object set; generating a second augmented reality element corresponding to the second relevant item data object; and causing rendering, to the user interface, the second captured image augmented based on at least the second augmented reality element, wherein the second augmented reality element is rendered based on a second item position associated with a second item representation corresponding to the second augmented reality element.

Additionally or alternatively, in some example embodiments of the computer-implemented method, the computer-implemented method further comprises capturing, using an imaging apparatus, a second captured image comprising a second visual indicia set; decoding, from the second visual indicia set, a second scanned item data set associated with the second visual indicia set, wherein the second scanned item data set represents a loaded item data set; detecting, from the second scanned item data set, an improper item data object based on the target item data set; generating an improper scanned item notification based on at least the improper item data object; and causing rendering, to the user interface, of the improper scanned item notification.

Additionally or alternatively, in some example embodiments of the computer-implemented method, the computer-implemented method further comprises capturing, using an imaging apparatus, a second captured image comprising a second visual indicia set; decoding, from the second visual indicia set, a second scanned item data set associated with the second visual indicia set, wherein the second scanned item data set represents an unloaded item data set; identifying, based on at least the second scanned item data set, an improper unloaded item data object; generating an improper unloaded item notification based on at least the improper unloaded item data object; and causing rendering, to the user interface, of the improper unloaded item notification.

Additionally or alternatively, in some example embodiments of the computer-implemented method, the target item data set comprises a first target item data set associated with a first device location, and the computer-implemented method further comprises identifying a second device location, wherein the second device location is associated with at least a second portion of the item distribution route data; retrieving a second target item data set based on at least the item distribution route data and the second device location; capturing, using an imaging apparatus, a second captured image comprising a second item representation set and a second item information representation set associated with the second item representation set; identifying, from a second item information representation of the second item information representation set, a second scanned item data object corresponding to a second item representation associated with the second item information representation; identifying the second scanned item data object comprises a missed item data object associated with the first device location; generating a missed item notification based on at least the missed item data object associated with the first device location; and causing rendering, to the user interface, of the missed item notification.

Additionally or alternatively, in some example embodiments of the computer-implemented method, the target item data set is retrieved from a remote server over a first communications network via at least one application programming interface.

Additionally or alternatively, in some example embodiments of the computer-implemented method, receiving the captured image comprises capturing the captured image using a multi-imager imaging apparatus.

In accordance with yet another aspect of the disclosure, an apparatus for automatic item searching and verification is provided. In one example embodiment, the apparatus includes at least one processor and at least one memory, the at least one memory having computer-coded instructions stored thereon that, in execution with the at least one processor, configure the apparatus to perform any of the example computer-implemented methods described herein. In yet another example embodiment, the apparatus includes means for performing each of the steps of any of the computer-implemented methods described herein. In one or more embodiments, the apparatus includes or is otherwise communicable with an imaging apparatus or engine configured for capturing image data objects.

In accordance with yet another aspect of the disclosure, a computer program product for automatic item searching and verification is provided. In one example embodiment, the computer program product includes at least one non-transitory computer-readable storage medium having computer program code thereon, where the computer program code in execution with at least one processor is configured to perform any of the computer-implemented methods described herein.

BRIEF DESCRIPTION OF THE DRAWINGS

Figure 1:
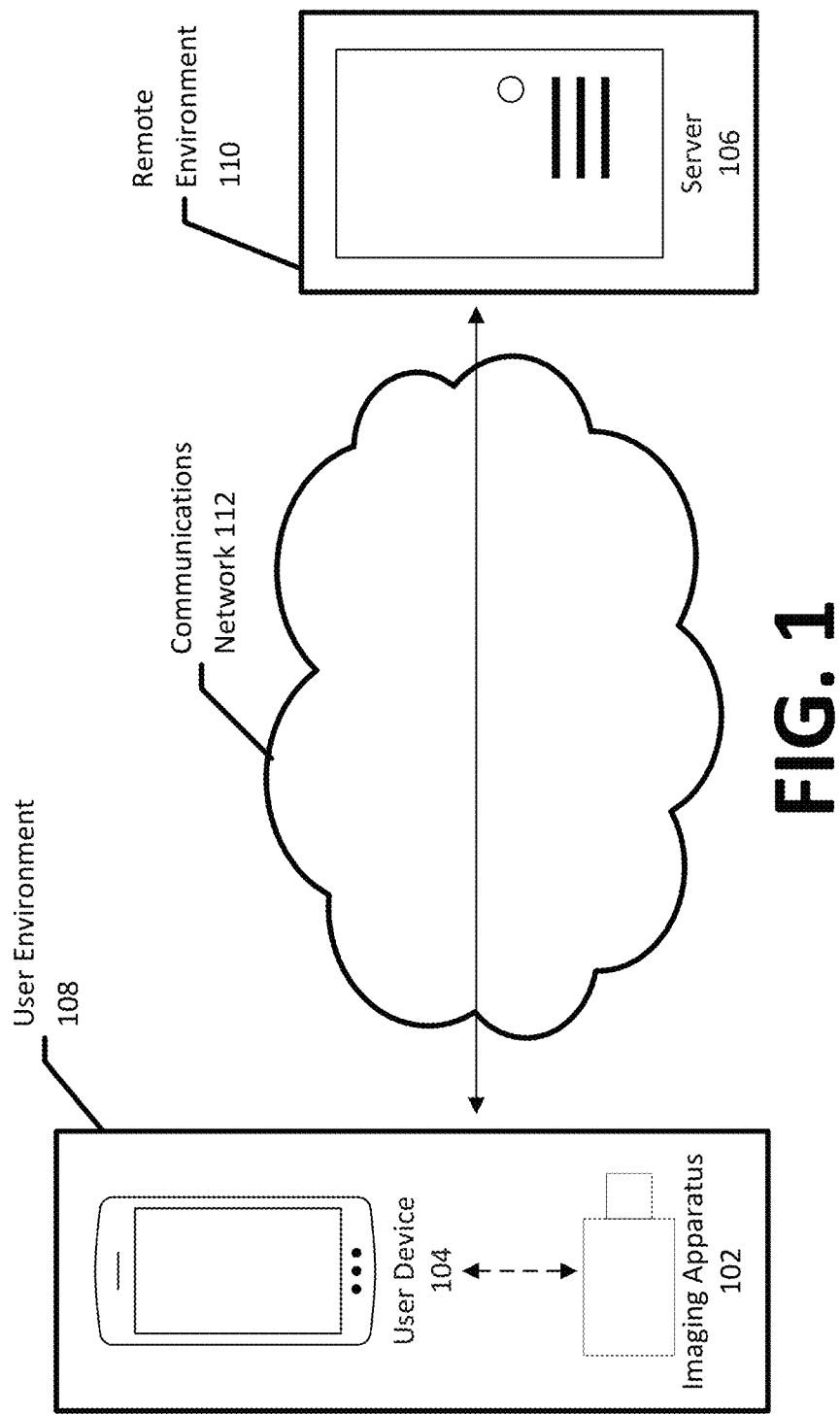
Figure 2:
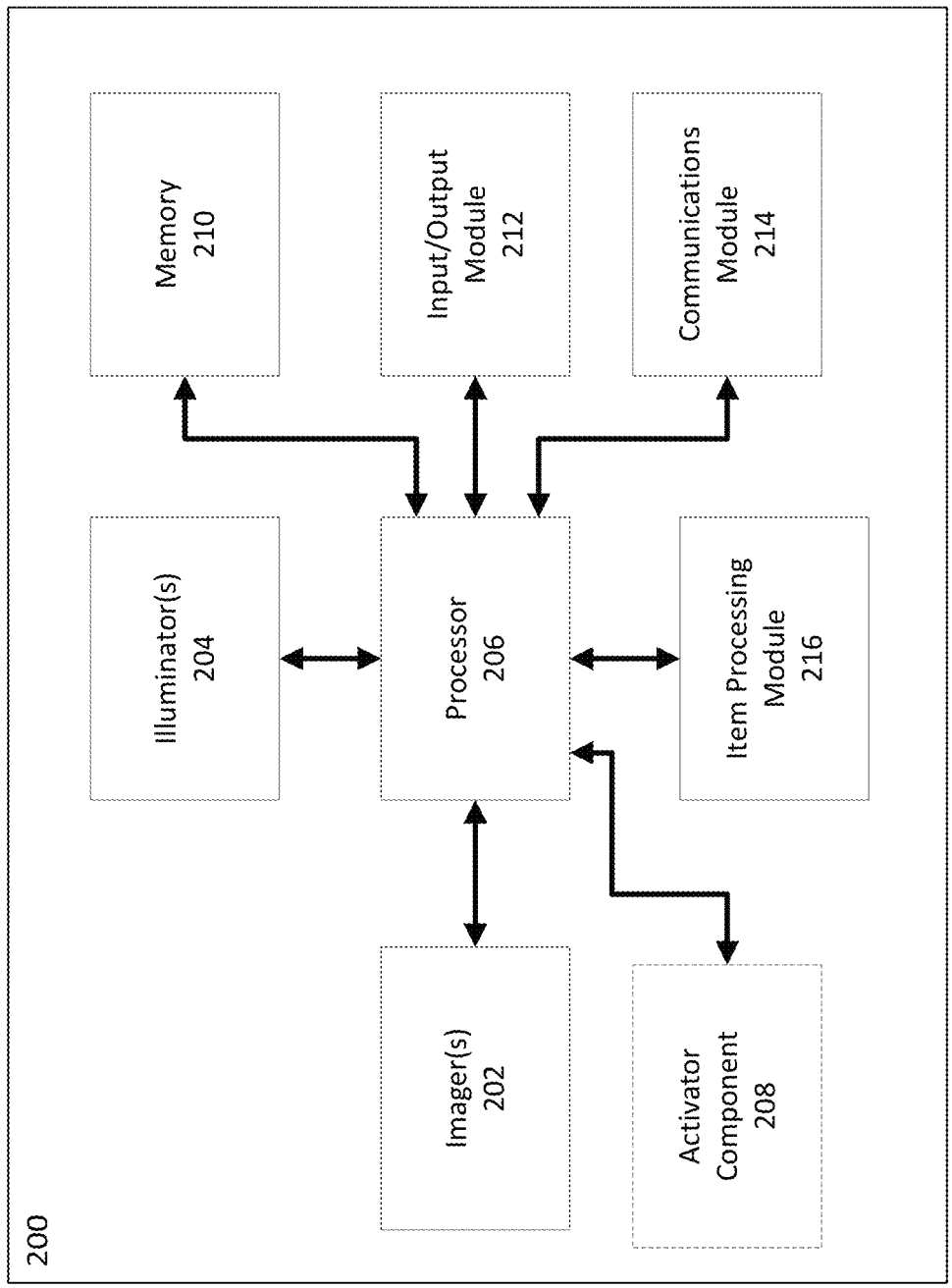
Figure 3:
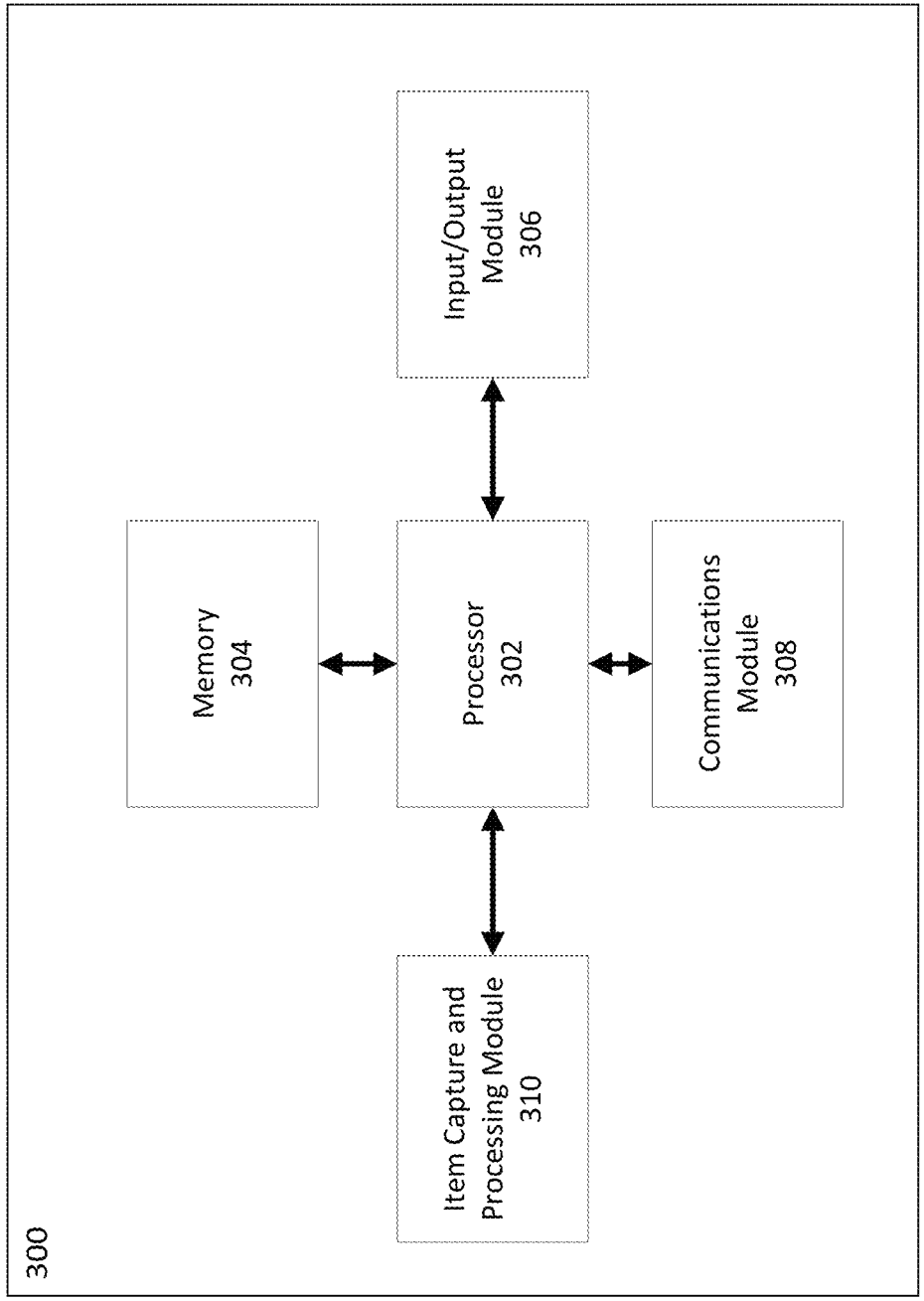
Figure 4:
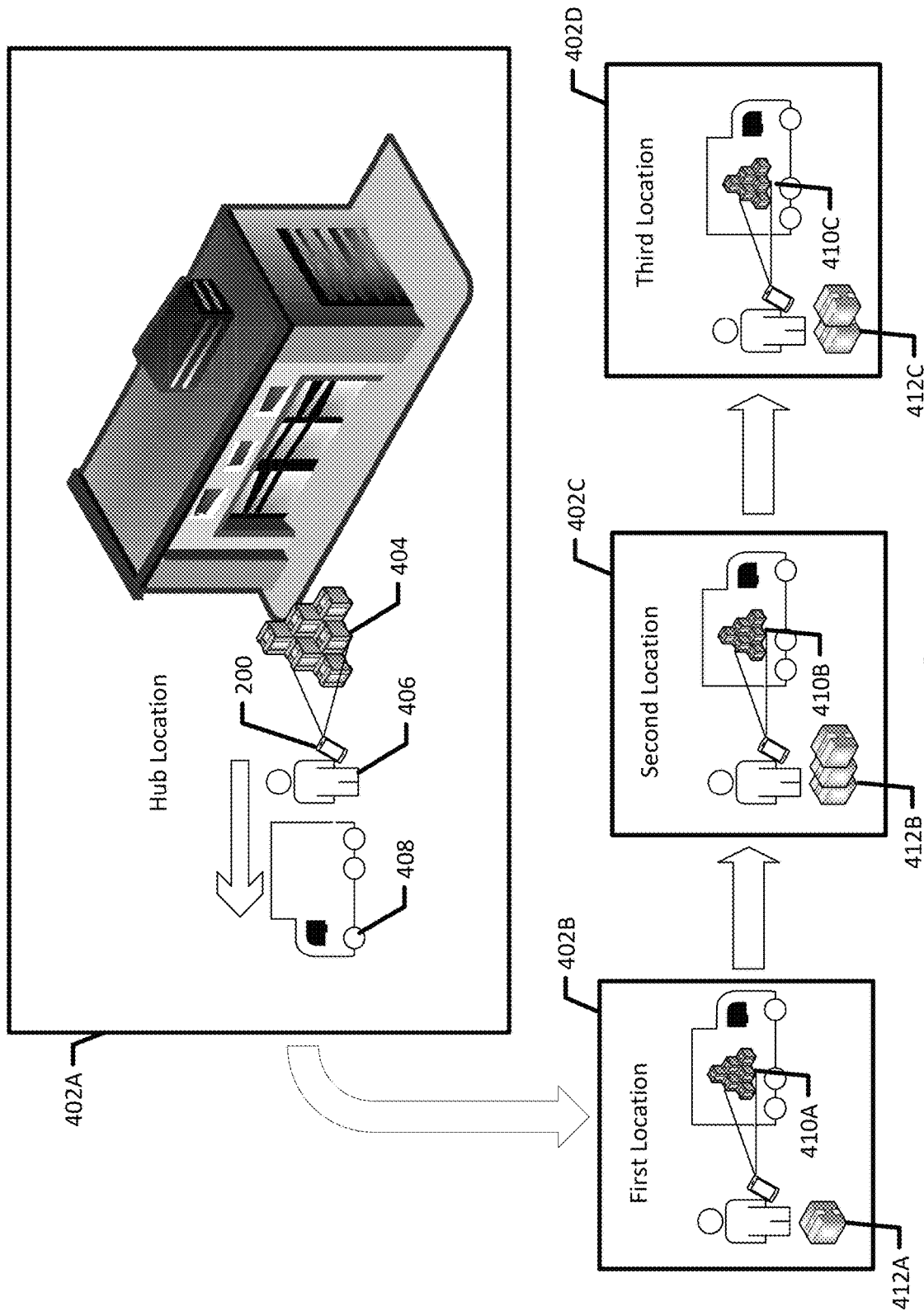
Figure 5:
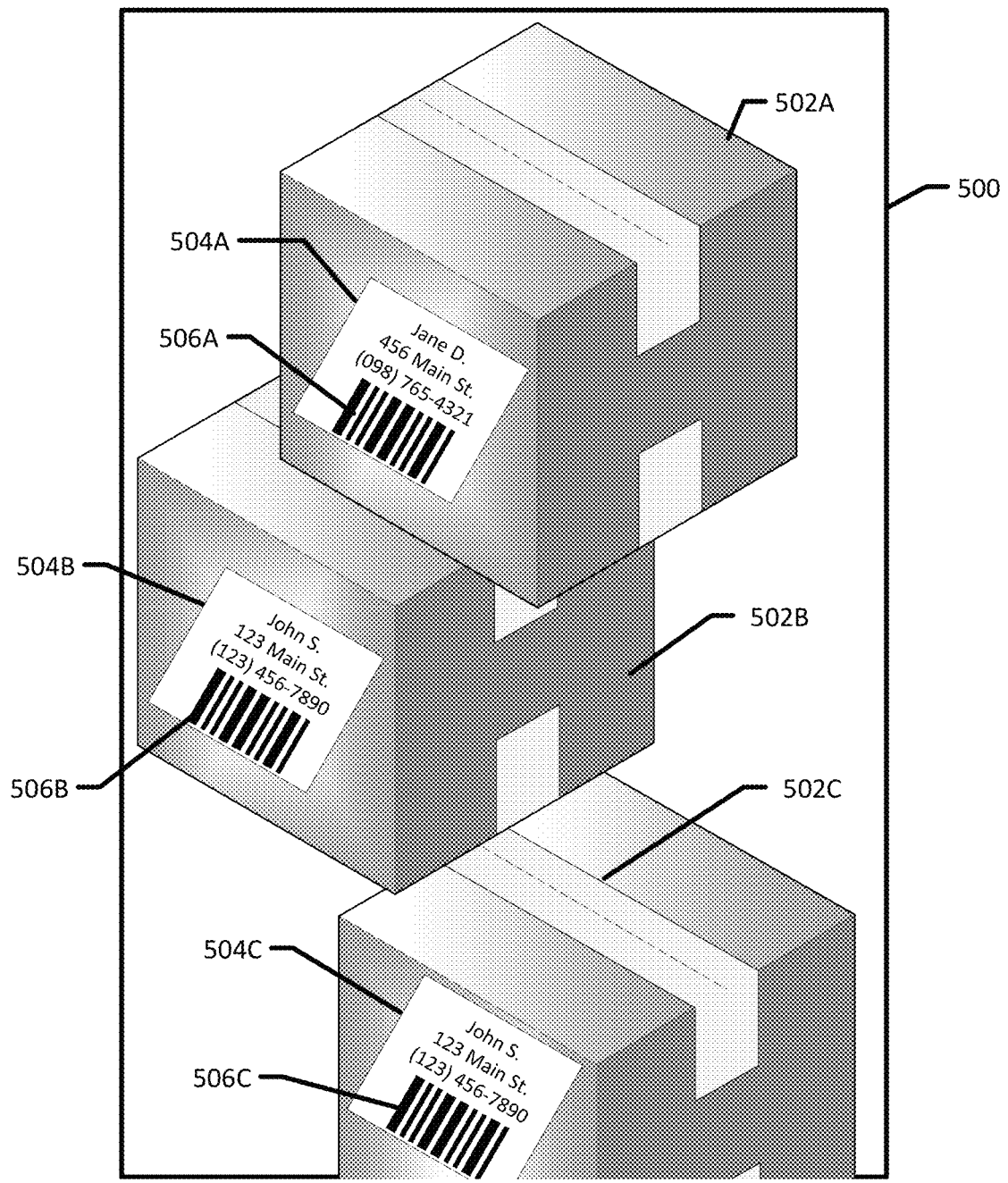
Figure 6:
Figure 7:
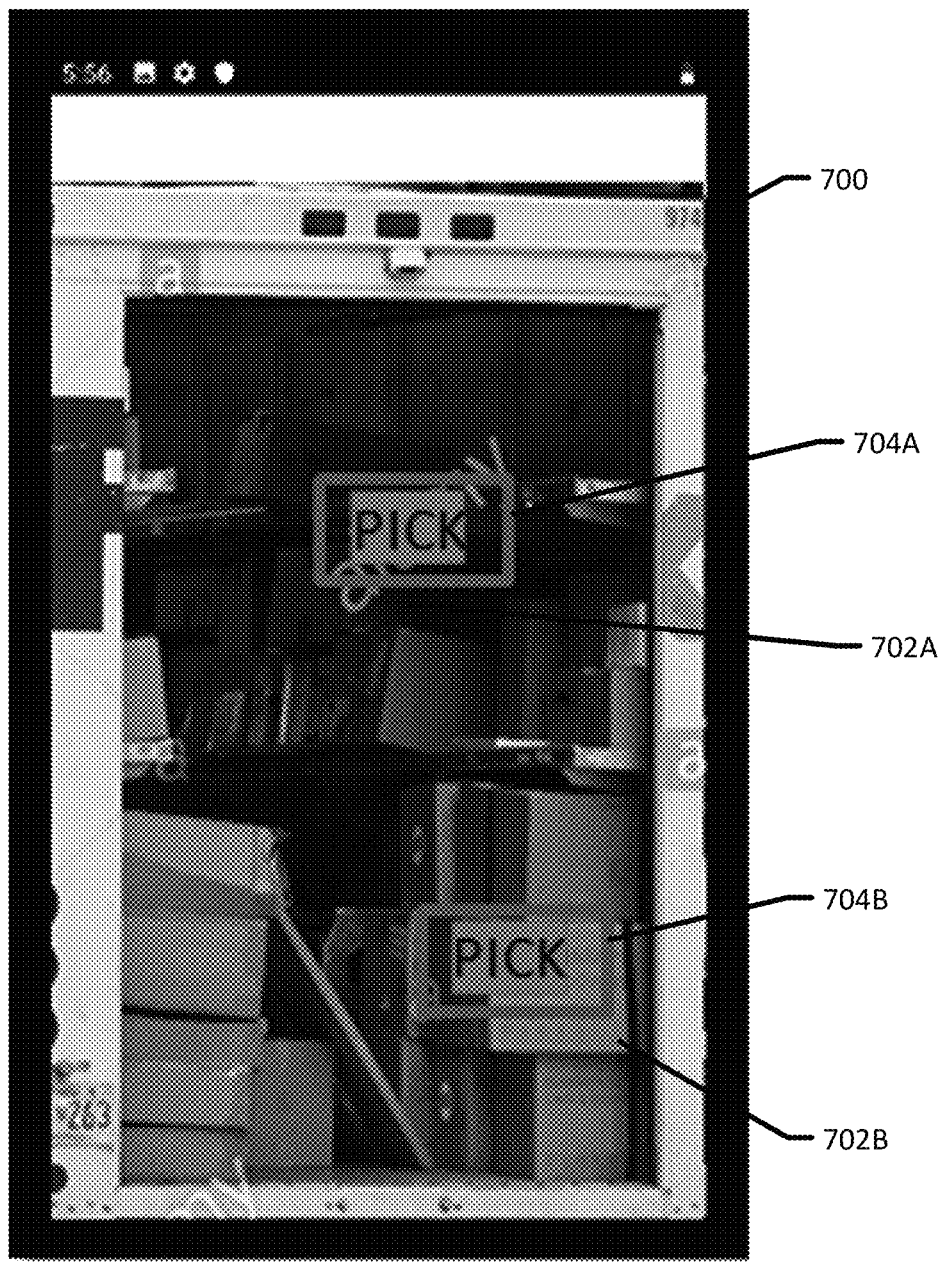
Figure 8:
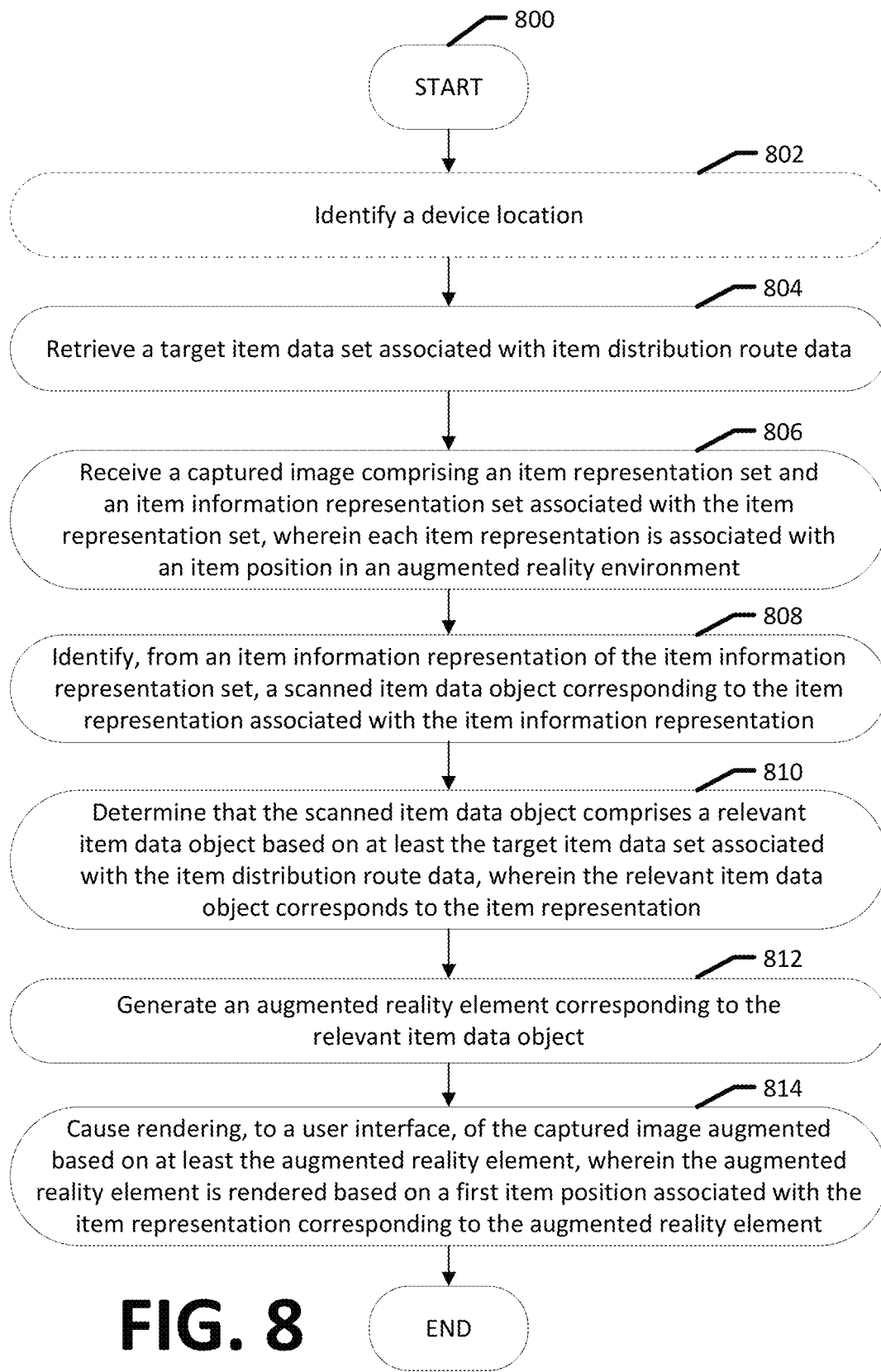
Figure 9:
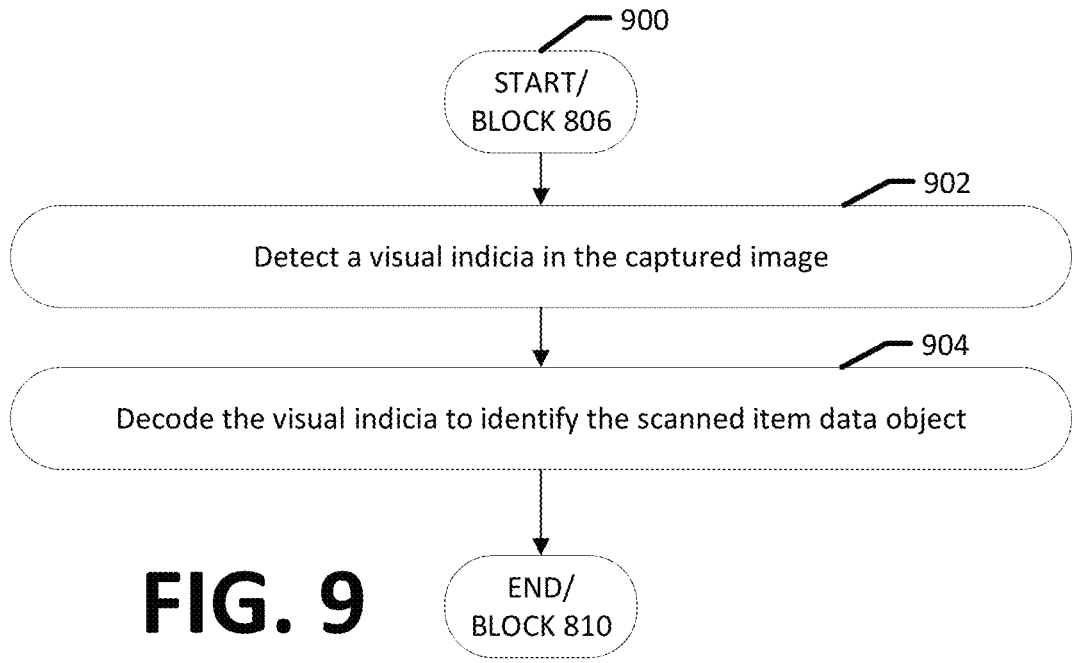
Figure 10:
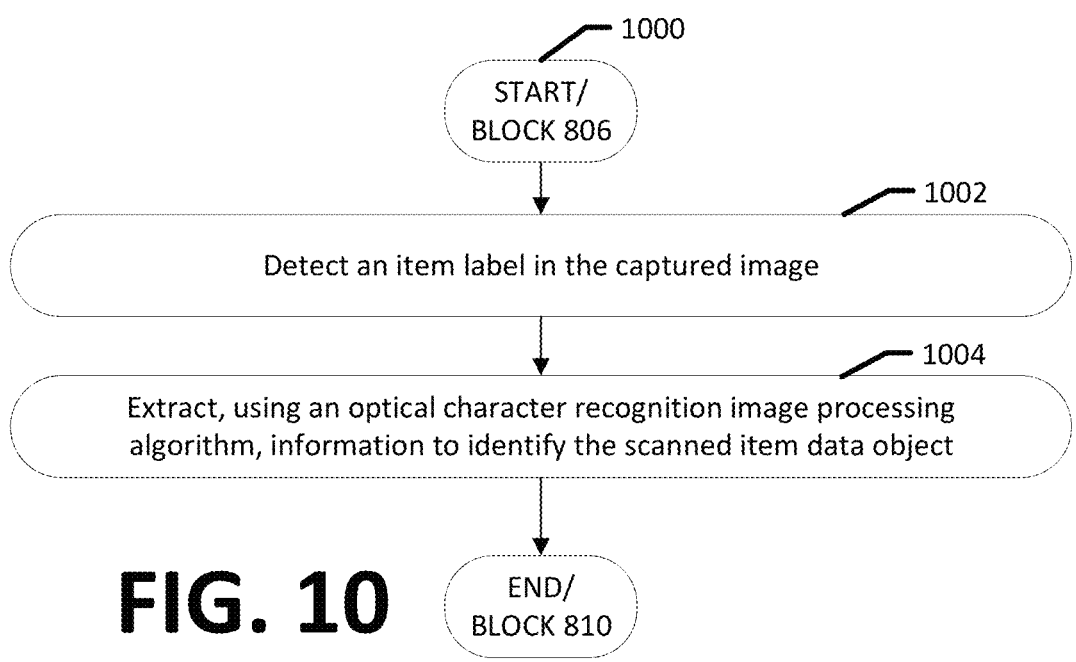
Figure 11:
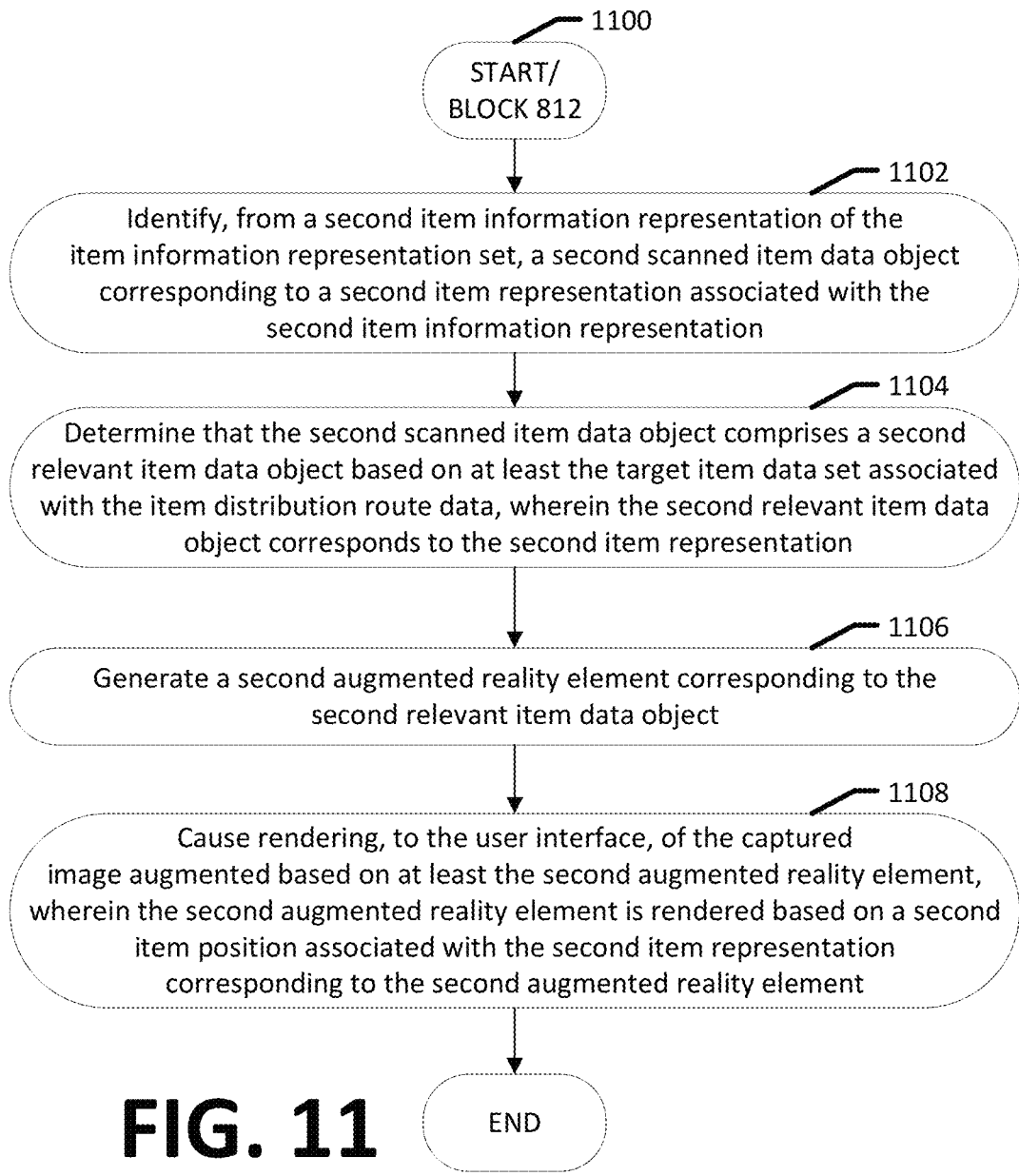
Figure 12:
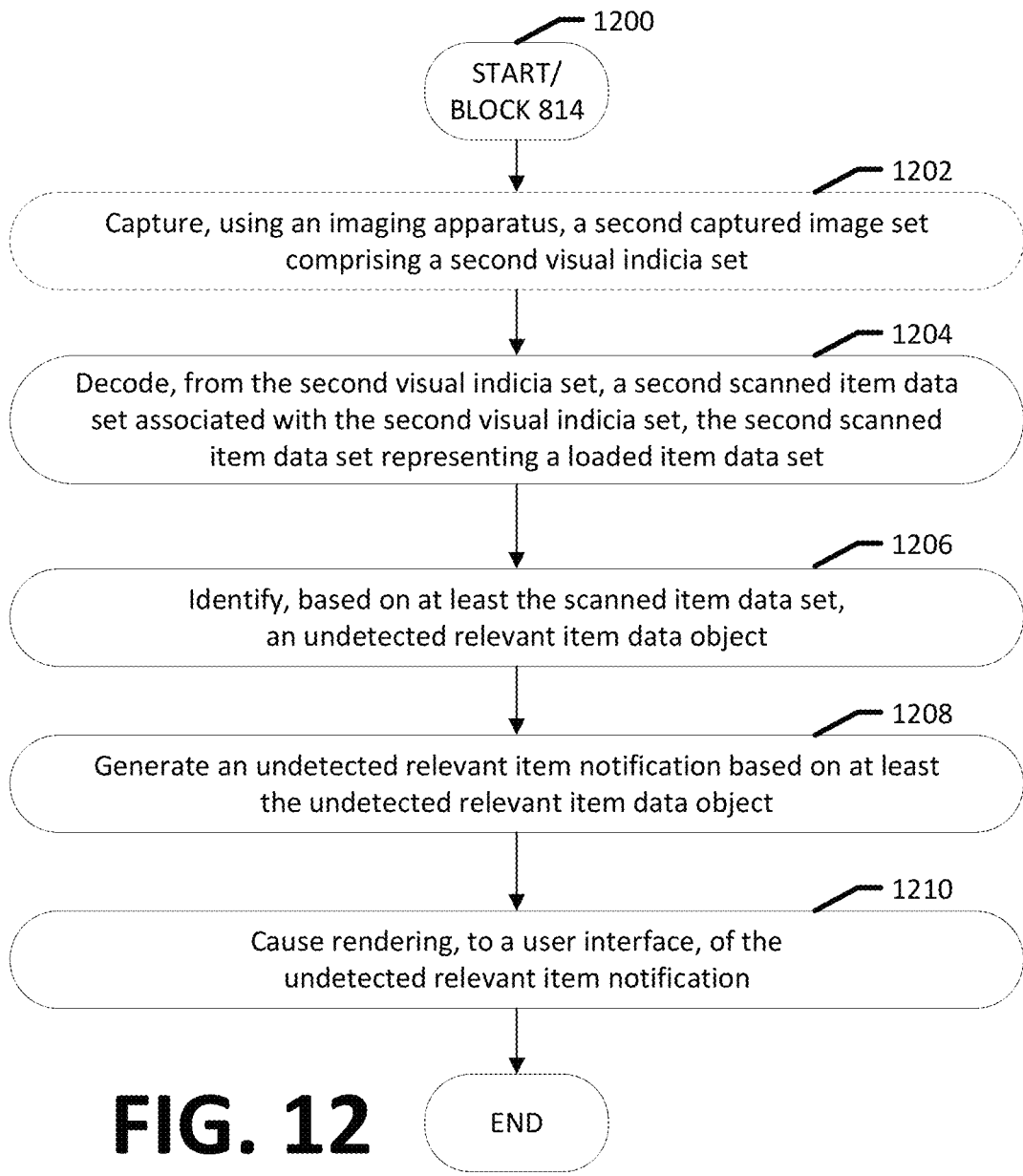
Figure 13:
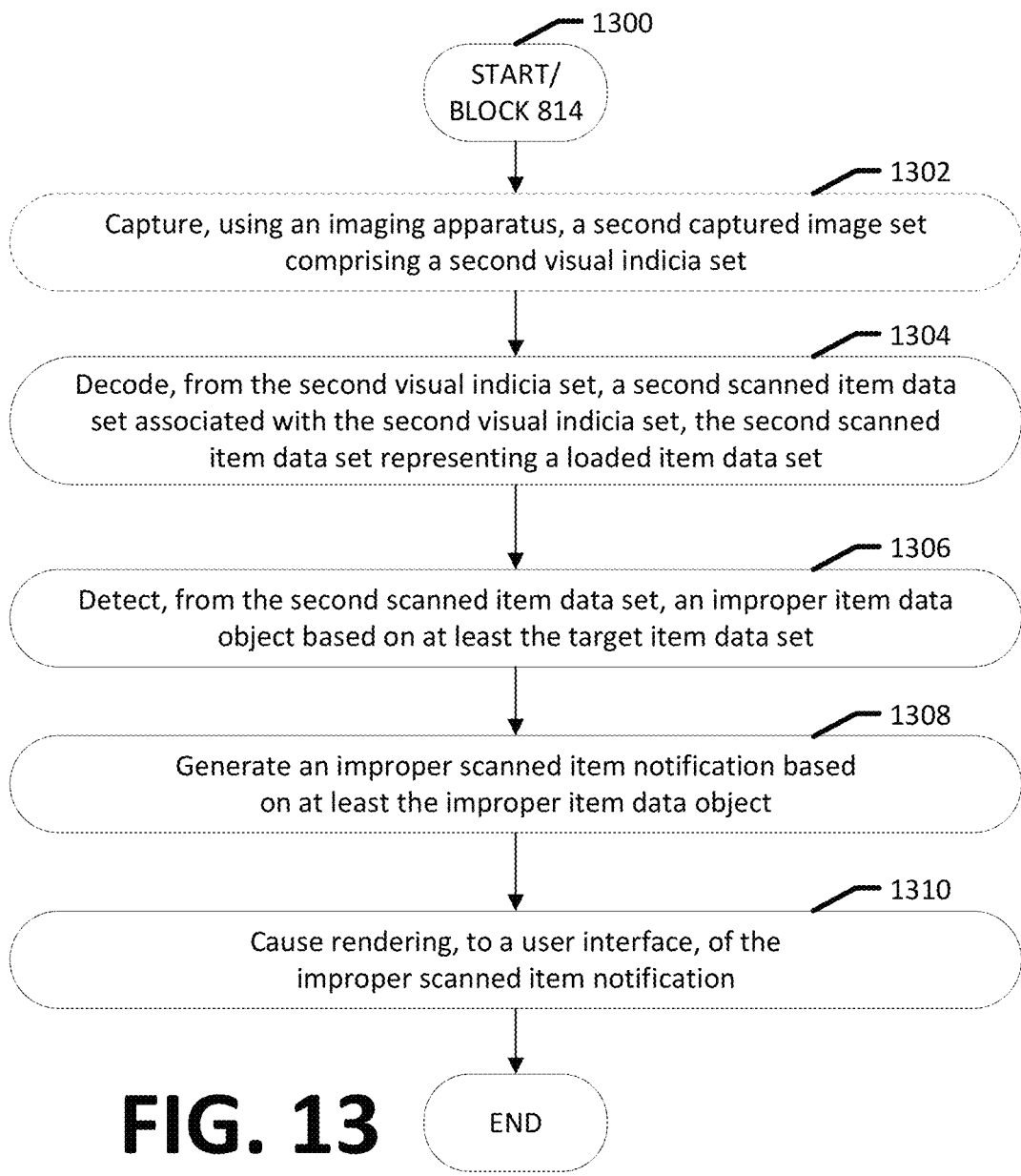
Figure 14:
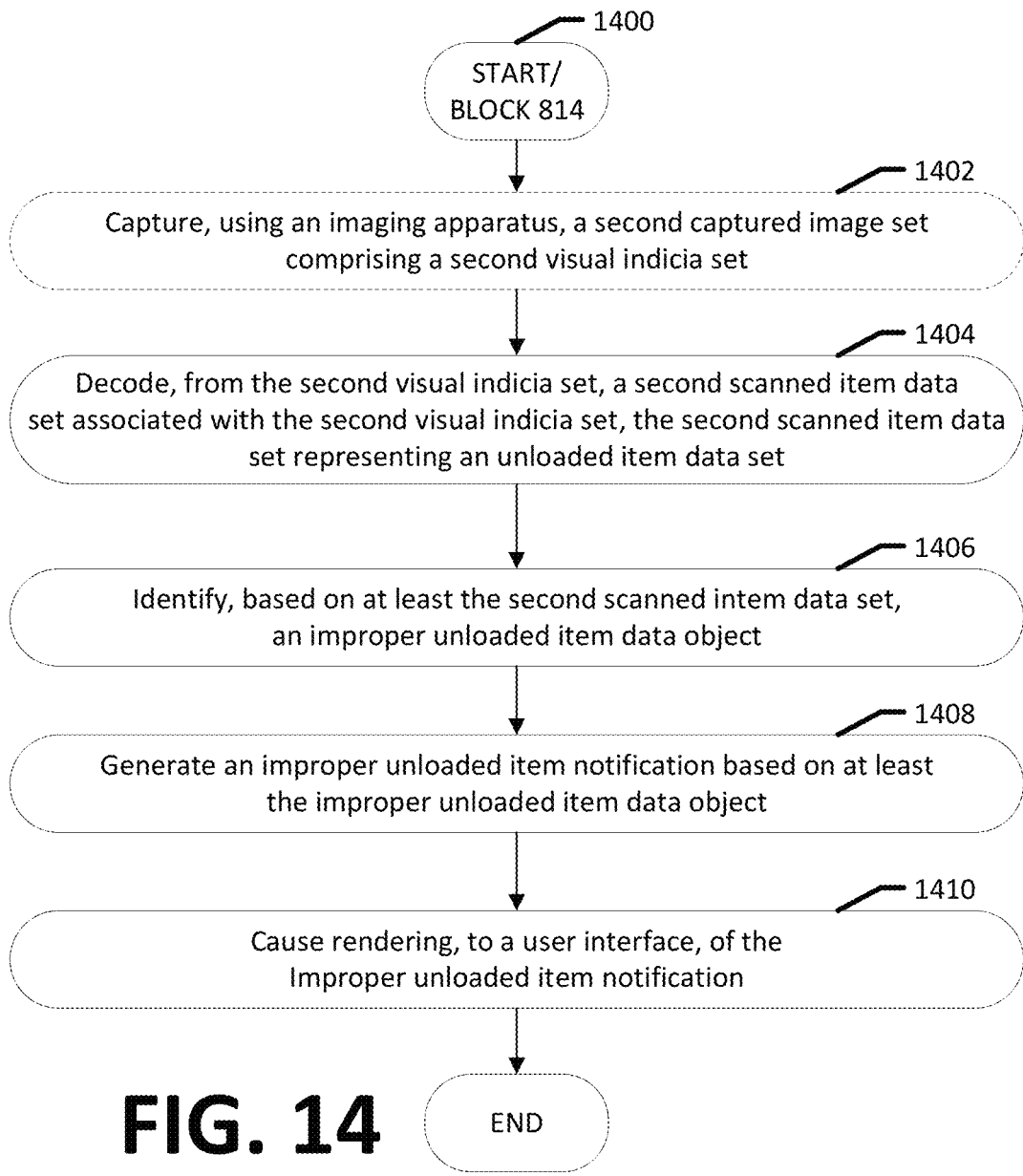

Having thus described the embodiments of the disclosure in general terms, reference now will be made to the accompanying drawings, which are not necessarily drawn to scale, and wherein:

FIG. 1 illustrates a block diagram of a specially configured system within which example embodiments of the present disclosure may operate;

FIG. 2 illustrates a block diagram of an example apparatus that may be specially configured in accordance with at least one example embodiment of the present disclosure;

FIG. 3 illustrates another block diagram of a second example apparatus that may be specially configured in accordance with at least one example embodiment of the present disclosure;

FIG. 4 illustrates a visualization of an example context for item searching and verification along an example item distribution route, in accordance with at least one example embodiment of the present disclosure;

FIG. 5 illustrates an example captured image for processing, in accordance with at least one example embodiment of the present disclosure;

FIG. 6 illustrates an example user interface including a rendering of an augmented reality environment including augmented reality elements for loading, in accordance with at least one example embodiment of the present disclosure;

FIG. 7 illustrates an example user interface including a rendering of an augmented reality environment including at least one augmented reality element for unloading, in accordance with at least one example embodiment of the present disclosure;

FIG. 8 illustrates a flowchart including example operations for automatic item searching and verification, in accordance with at least one example embodiment of the present disclosure;

FIG. 9 illustrates a flowchart including additional example operations of an example process for automatic item searching and verification, in accordance with at least one example embodiment of the present disclosure;

FIG. 10 illustrates a flowchart including additional example operations of an example process for automatic item searching and verification, in accordance with at least one example embodiment of the present disclosure FIG. 11 illustrates a flowchart including additional example operations for automatic item searching and verification, in accordance with at least one example embodiment of the present disclosure;

FIG. 12 illustrates a flowchart including additional example operations for automatic item searching and verification, in accordance with at least one example embodiment of the present disclosure;

FIG. 13 illustrates a flowchart including additional example operations for automatic item switching and verification, in accordance with at least one example embodiment of the present disclosure;

FIG. 14 illustrates a flowchart including additional example operations for automatic item switching and verification, in accordance with at least one example embodiment of the present disclosure; and FIG. 15 illustrates a flowchart including additional example operations for automatic item switching and verification, in accordance with at least one example embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

An item searching and verification process may be utilized in any of a myriad of processes. One example of item searching and verification occurs during delivery of packages and/or other parcels from a first location to a second, such as from a loading hub to a final delivery location (e.g., a home or business address).

In this context for example, item loading and unloading is conventionally a manual-driven process requiring significant user interaction in accomplishing the loading or unloading task successfully. At the hub, for example, a user, such as a delivery person, conventionally analyzes a set of packages or other items to determine which are to be loaded for a particular delivery route. Similarly, at a delivery location, the same or a different user conventionally analyses a set of packages (or other items) to determine which are to be unloaded for delivery at a particular location. Ordinarily, the user inspects each package one at a time to scan and/or analyze information on a package label associated with the package. Such scanning and/or analyzing of each individual package enables the user to determine whether it is proper to load the package for a particular delivery route and/or unload the package at a particular location along the route.

Such example conventional processes for package identification and verification are inefficient, as scanning each package one at a time means a significant amount of time may pass before the user successfully identifies all packages for loading and/or unloading. Using technology that enables scanning from a distance, such scanning of each package one at a time still limits efficiency. Additionally, conventional processes utilizing human-driven actions are error prone. For example, a user may wrongly analyze information associated with a package (e.g., on a package label) and choose to load the package at an improper location (e.g., when it is not required for a route, making it impossible for another user to deliver the package until the user returns the package to the loading location) and/or unload the package at an improper location (e.g., delivering a package to a wrong package). Similarly, a user may wrongly analyze information associated with a package (e.g., on the package label) and choose not to load the package when appropriate (e.g., not loading it for a delivery route when it is required to be delivered on the route) and/or choose not to unload the package when appropriate (e.g., not unloading it for delivery at an appropriate location, and proceeding to the next location). Conventionally, such errors may be overlooked for a substantial period of time, such as until all other deliveries along a route are completed, a customer complaint is received, or in some circumstances, indefinitely. In this regard, improving the efficiency and/or reducing the error in item searching and verification is desirable for improving overall efficiency of item distribution, such as in the shipping context.

Example embodiments of the present disclosure include apparatuses, computer-implemented methods, and computer program products for automatic item searching and verification. In this regard, embodiments may be used to capture an image set comprising one or more captured images, process the captured images, and produce one or more user interfaces including elements that identify items to be loaded and/or unloaded at a current location. For example, an imaging apparatus may be utilized to capture the image set, where the captured image(s) include representations of any number of packages stored at the hub location, and visual indicia associated with each of the packages such as barcodes on the package label for each package. The visual indicia may encode any of a myriad of package information, such as one or more package identifiers, delivery location information, recipient information, and/or the like, which may be additional to and/or provided together with information on the package label. The visual indicia, and/or other information on the package label, may be processed to identify data associated with each package. Embodiments further enable retrieval and/or determination of a target item data set associated with particular item distribution route data, such that the items for loading for a particular delivery route and/or unloading at a particular location may be identified. In this regard, based on the scanned information and the target item data set, embodiments enable identification of the relevant items represented within the captured image set. Embodiments then enable visual distinguishing of relevant items (e.g., items to be loaded or unloaded at the current location) in an augmented reality, such as by generating augmented reality elements and rendering the captured image(s) altered based on such augmented reality elements.

In this regard, embodiments of the present disclosure enable automatic searching and verification of items for which user interaction is required. In the context of item loading, for example at a hub location, a captured image may include representations of various items, and the captured image(s) may be processed to enable rendering of an augmented reality including the captured image together with augmented reality elements that identify items for delivery along a particular delivery route. Such embodiments eliminate the human-drive process of identifying such packages, and reduce the opportunity for errors in identifying such packages, reducing the chance that the user fails to identify a particular package that is appropriate for loading. Similarly, in contexts of item unloading, for example at a delivery location, a captured image may include representations of various items loaded onto a delivery vehicle, and the captured image(s) may be processed to enable rendering of an augmented reality including the captured image together with augmented reality elements that identify items for delivery at the current location. Using an identified device location, embodiments enable identification and visual distinguishing of the specific set of items to be delivered at a current location without requiring the user to perform such analysis. Furthermore, by automatically identifying the packages that are loaded or unloaded at each location, example embodiments may detect errors in circumstances where items are loaded and/or unloaded at improper times, and alert the user that such errors have occurred.

In this regard, example embodiments of the present disclosure eliminate and/or otherwise reduce human-based analysis in item searching and verification for loading and/or unloading, such as for item distribution. In an example context, embodiments of the present disclosure improves the efficiency identification of items for loading and/or unloading. Additionally or alternatively, example embodiments improve the accuracy of item identification for unloading and/or loading, and provide improved user interfaces to the user that include such identifications. Additionally, example embodiments reduce the likelihood of errors during item loading and/or unloading, and enable detection and user notification when such errors have occurred, reducing the likelihood that such errors manifest or result in negative effects. Additionally or alternatively, example embodiments provide improvements over conventional scanning devices by reducing the number of individual scanning operations that may be required to identify the complete set of items relevant for a loading and/or unloading operation at each location, and additionally or alternatively still may be performed from a range such that a user need not interact with each item individually to successfully complete a desired operation, such as an unloading or loading operation.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The term "item data object" refers to electronically managed data representing one or more properties and/or information associated with an item, package, box, parcel, or other transportable object. In some embodiments, an item data object comprises at least one or more data values embodying an item data object identifier that uniquely identifies the item data object. The term "item data set" refers to a data object embodying zero or more item data object(s). Non-limiting examples of an item data set include an array of item data objects, a vector of item data objects, a list of item data objects, and the like.

The term "item distribution route" refers to a set of one or more addresses, coordinates, or other locations for which items are to be delivered. In some embodiments, for example, an item distribution route includes a plurality of addresses (or plurality of locations) where at least one item is to be delivered to each of the plurality of addresses. In some embodiments, for example, an item distribution route includes a single address (or other location) where at least one item is to be delivered.

The term "item distribution route data" refers to electronically managed data representing an item distribution route. In some embodiments, item distribution route data comprises location data representing one or more locations, each location associated with at least one item data object corresponding to an item to be delivered at that location. Additionally or alternatively, in some embodiments, item distribution route data comprises item data object(s) associated with items to be delivered at each location. It should be appreciated that the item distribution route data may include any number of locations, and each location may be associated with any number of item data objects.

The term "target item data object" refers to electronically managed data representing an item data object for unloading and/or unloading associated with an item distribution route. In at least one context, a target item data object embodies an item data object (or at least a portion thereof, such as at least an item data object identifier) to be loaded into a delivery vehicle at a particular location for delivery associated with an item distribution route. In at least one other context, a target item data object embodies an item data object (or at least a portion thereof, such as at least an item data object identifier) to be unloaded for delivery at a particular location along an item distribution route. The term "target item data set" refers to a data object embodying zero or more target item data objects. In at least one example context, for example a loading operation, a target item data set is associated with item distribution route data such that the target item data set includes item data objects for each item to be loaded at a current location. In at least another example context, such as an unloading operation, a target item data set is associated with item distribution route data such that the target item data set includes item data objects for each item to be unloaded at a current location.

The term "loaded item data set" refers to electronically managed data representing zero or more item data object(s) identified and/or otherwise indicated as currently loaded at a particular location and available for unloading via an unloading operation.

The term "unloaded item data set" refers to electronically managed data representing zero or more item data object(s) identified and/or otherwise indicated as currently unloaded at a particular location and available for loading via a loading operation.

The term "imaging apparatus" refers to computing hardware, software, firmware, and/or a combination thereof, for capturing one or more captured images and/or processing the one or more captured images. In at least one example embodiment, an imaging apparatus comprises one or more imager(s) comprising image capture optics, an image sensor, and optionally one or more illumination sources and/or corresponding illumination projection optics. In some embodiments, the imaging apparatus includes a display configured for providing one or more user interfaces to a user, and/or receiving user input from the user.

The term "multi-imager imaging apparatus" refers to an imaging apparatus comprising a plurality of imagers. In at least one example embodiment, a multi-imager imaging apparatus includes an illuminator for each imager, each including an illumination source and illumination projection optics specially configured for illuminating a field of view capturable by the corresponding imager. A multi-imager imaging apparatus may include any number of imagers, including without limitation a dual-imager imaging apparatus (e.g., a near-far range imaging apparatus), a tri-imager imaging apparatus (near-mid-far range imaging apparatus), or the like. At least one non-limiting example multi-imager imaging apparatus is described in U.S. non-provisional application Ser. No. 16/684,124 titled "Integrated Illumination-Aimer Imaging Apparatuses", filed Nov. 14, 2019, the content of which is incorporated herein by reference in its entirety.

The term "captured image" refers to electronically managed data output by an image sensor representing light captured by the image sensor within a particular field of view during an exposure period. In some embodiments, a captured image is embodied by a data object in any known image file format, including without limitation a JPG, TIFF, PNG, or other image file format. The term "captured image set" refers to a data object embodying one or more captured images for processing.

The term "visual indicia" refers to a visual encoding of data that may be scanned by being detecting and decoding, using one or more algorithms, to identify the data values and/or data object embodied by the visual indicia. In some embodiments, a visual indicia is embodied by a machine-readable symbology, such as a 1-D barcode, 2-D barcode, or the like. The term "visual indicia set" refers to a data object embodying zero or more visual indicia.

The term "item representation" refers to a portion of data within a captured image that embodies an item within the captured field of view. In one example context, the item representation is embodied by a set of pixels that corresponds to a particular package represented in a captured image. It should be appreciated that a captured image may include any number of item representations.

The term "item information representation" refers to a portion of data within a captured image that embodies an item label, visual indicia, and/or other human-readable and/or machine-readable data associated with a corresponding item. For example, the item information representation includes representations of various data values of an item data object or visual indicia encodings thereof. In some embodiments, an item information representation embodies an item label representation corresponding to an item label located on an item. In some embodiments, an item information representation embodies a visual indicia located on an item and/or item label on or associated with the item.

The term "item position" refers to a coordinate in two-dimensional or three-dimensional space that corresponds to a position in an augmented reality environment where an augmented reality element associated with an item representation should be rendered. In some embodiments, for example, an item position corresponds to a position determined to be on or near the item represented in a captured image such that a user would associate an augmented reality element at that position with the corresponding item. In some embodiments, an item position is determinable based on a position of a visual indicia. In some embodiments, an item position is determinable based on image processing of an item representation, such as to determine a center point on the object, a position associated with a feature of the item (e.g., a corner), or any desired offset therefrom.

The term "augmented reality environment" refers to electronically managed data representing a real-world environment to enable rendering any number of virtual elements within captured representations of the real-world environment. In some embodiments, an augmented reality environment corresponds to a three-dimensional coordinate system such that augmented reality elements may be rendered within the representation of the real-world environment based on the three-dimensional coordinate system. In other embodiments, an augmented reality environment corresponds to a two-dimensional coordinate system.

The term "scanned item data object" refers to electronically managed data representing one or more data value(s) or data object(s) decoded from information within a captured image, such as from an item information representation. In at least one example context, a scanned item data object embodies an item data object or portion of data thereof represented by a visual indicia associated with an item, such as a package. The term "scanned item data set" refers to any number of scanned item data object(s), which may be embodied in one or more collection(s), array(s), or other data structure(s). The term "scanned item data set" refers to a data object embodying zero or more scanned item data object(s).

The term "relevant item data object" refers to an item data object identified as relevant for a current loading or unloading operation. In some embodiments, a relevant item data object corresponds to an item data object within a target item data set corresponding to a particular item distribution route, and identified as associated with a scanned item data object or within a scanned item data set. In some embodiments, a relevant item data object is additionally or alternatively associated with a particular location, such as a location that corresponds to a loading location and/or unloading/delivery location. In at least one example context, a relevant item data object represents an item data object identified within a scanned item data set, where the item data object corresponds to an item to be loaded onto a delivery truck or unloaded from a delivery vehicle. for delivery at a current location associated with the delivery vehicle. The term "relevant item data set" refers to a data object embodying zero or more relevant item data object(s).

The term "relevant visual indicia" refers to a visual indicia that encodes a relevant item data object, where the relevant visual indicia is represented within a captured image. The term "relevant visual indicia set" refers to a data object embodying zero or more relevant visual indicia(s).

The term "augmented reality element" refers to virtual data generated and/or otherwise configured for rendering within an augmented reality environment. In some embodiments, an augmented reality element is rendered together with one or more captured images representing a real-world environment, such that the virtual data augments the captured representation of the real-world environment. The term "augmented reality element set" refers to a data object embodying zero or more augmented reality element(s).

The term "user interface" refers to one or more elements enabling display of information via a display, and/or user interaction by a user. In some embodiments, a user interface includes one or more buttons, images, text, and/or other user controls.

The term "loaded item data object" refers to a item data object corresponding to an item determined to be, or indicated by a user as, loaded during a loading operation. In at least one non-limiting example context, the loaded item data object represents an item that is loaded on a delivery vehicle. The term "loaded item data set" refers to a data object embodying zero or more loaded item data object(s).

The term "undetected relevant item data object" refers to an item data object not identified in a scanned item data set that is expected to be in the scanned item data set. In some embodiments, an undetected relevant item data object corresponds to an item for delivery at a current location or a future location along an item distribution route. In at least one example context, an undetected relevant item data object may have been improperly unloaded by a user at an earlier location before a correct delivery location was reached.

The term "undetected relevant item notification" refers to data embodying a user interface element, or information for rendering via a user interface element, associated with an undetected relevant item data object. In some embodiments, an undetected relevant item notification includes at least a portion of data embodied by or otherwise associated with undetected relevant item data object, such as at least an item data object identifier and/or text indicating the item is undetected from a set.

The term "improper item data object" refers to an item data object that is not to be loaded at a particular location, or is not to be unloaded at a particular location. In a non-limiting example context, an improper item data object may be identified by scanning a visual indicia associated with a corresponding item that is not to be loaded at a current location, or not to be unloaded at a current location. The term "improper item data set" refers to a data object embodying zero or more improper item data object(s).

The term "improper scanned item notification" refers to data embodying a user interface element, or information for rendering via a user interface element, associated with an improper item data object. In some embodiments, an improper scanned item notification includes at least a portion of data embodied by or otherwise associated with an improper item data object, such as at least an item data object identifier and/or text indicating the item is improper for loading or unloading.

The term "device location" refers to electronic data representation of a location for a computing device. A device location may be identified or detected in any of a myriad of manners, including without limitation GPS, wireless location detection, cellular location detection, manual location input, and address detection or input.

The term "unloaded item data object" refers to an item data object indicated or determined as unloaded from a set of loaded items. In some embodiments, a user scans a visual indicia encoding an item data object during unloading to indicate the item has been unloaded or otherwise delivered. The term "unloaded item data set" refers to a data object embodying zero or more unloaded item data object(s). The term "improper unloaded item data object" refers to an item data object determined and/or otherwise indicated as unloaded at a particular location that differs from the correct delivery location represented in the item data object.

The term "missed item data object" refers to an item data object indicated or determined or indicated as having not been unloaded at a previous location along an item distribution route. In some embodiments, a missed item data object is detected from a scanned item data set based on a current location and item distribution route data. The term "missed item data set" refers to a data object embodying zero or more missed item data object(s).

The term "missed item notification" refers to data embodying a user interface element, or information for rendering via a user interface element, associated with a missed item data object. In some embodiments, a missed item notification includes at least a portion of data embodied by or otherwise associated with a missed item data object, such as at least an item data object identifier and/or text indicating delivery of the item was missed.

The term "remote server" refers to one or more computing device(s), embodied via physical or virtual component(s), distinct from an imaging apparatus and/or consumer device, with which the imaging apparatus and/or consumer device is communicable over one or more communications network (s). In at least one example context, a remote server stores item data object(s), item distribution route data for any number of item distribution route(s), consumer information such as biographical information, address(es), and/or other information utilized in item distribution processing, delivery, and/or shipping, The term "communications network" refers to one or more computing devices forming enabling data transmission between any two devices. In at least one example context, a computing device is configured to communicate over a communications network over a wired connection (e.g., ethernet or the like) or over a wireless connection (e.g., Wi-Fi or the like). Non-limiting examples of a communications network include the Internet or other public communication networks, and/or private communication networks such as local networks.

The term "item verification" refers to automatic and/or semi-automatic detection of whether an item scanned for loading and/or unloading is proper for such loading and/or unloading. In some embodiments, item verification further includes generation and/or providing of notification information upon determination of improper loading and/or unloading of an item.

Example System of the Present Disclosure

FIG. 1 illustrates a block diagram of a specially configured system within which example embodiments of the present disclosure may operate. The system includes one or more computing devices communicable with one another to enable automatic item searching and verification. Specifically, the system includes an imaging apparatus 102 and server 106. Optionally, in at least one embodiment, the system includes a user device 104 in communication with the imaging apparatus 102. It should be appreciated that one or more devices, such as the imaging apparatus 102 and/or user device 104, are located in a user environment 108 separate from a remote environment 110 associated with the server 106. In some such embodiments, the one or more computing devices located in the user environment 108 is configured to communicate with the server in the remote environment 110 over one or more communications networks, such as the communications network 112. In some embodiments, the imaging apparatus 102 is configured for directly communicating with the server 106. In other embodiments, the imaging apparatus 102 is configured for directly communicating over a first communications network with the user device 104 in the user environment 108, and the user device 104 is configured for directly communicating with the server 106 in the remote environment over a second communications network 112.

In at least one embodiment, the imaging apparatus 102 comprises a computing device configured for capturing images of an environment and/or processing the captured images for one or more image processing tasks. In at least one example context, one such image processing task includes visual indicia detection and decoding (e.g., barcode scanning). In this regard, the imaging apparatus 102 may be configured for processing captured images to identify relevant items associated for loading or unloading and/or cause rendering of user interface elements indicating such relevant items, for example in an augmented reality environment. In some embodiments, the imaging apparatus 102 may directly communicate with the server 106, enabling a user to perform all functions required for automatic item searching and verification without communication through a secondary user device.

In some embodiments, the imaging apparatus 102 includes at least one imager for capturing images. It should be appreciated that in some embodiments, the imaging apparatus 102 includes a plurality of imagers for capturing images. For example in at least some embodiments, the imaging apparatus 102 includes at least a first imager focused at a near field of view (e.g., a near-field imager) and a second imager focused at a far field of view (e.g., a far-field imager), such that clear images are captured for each of the field of views at various ranges. It should be appreciated that the number of images may be increased such that any of a myriad of ranges are effectively covered. In some embodiments, the imaging apparatus 102 additionally includes one or more illuminator for illuminating the field of view(s) to be captured. In some embodiments, a specially configured illuminator corresponds to each imager, such that the appropriate illumination strength and/or pattern is produced for capturing the field of view by the corresponding imager. Alternatively or additionally, in some embodiments, an illuminator is configured to provide illumination for capture by a plurality of imagers.

Optionally, in at least some implementations, the imaging apparatus 102 functions in communication with another user device, such as the user device 104. In some embodiments, the user device 104 is embodied by one or more mobile computing hardware devices conventionally known in the art, such as a smartphone, personal digital assistant, personal computer (e.g., desktop or laptop), or the like. In some such embodiments, the user device 104 is specially configured for performing various processing and/or communication functions associated with automatic item searching and verification. In some such embodiments, for example, the user device 104 functions as the communication point between the imaging apparatus 102 and server 106. In this regard, the user device 104 may transmit and/or receive data over communications network 112, such as various request(s) to the server 106 for item data objects and/or item distribution route data, or responses to such request(s). The user device 104 may, additionally or alternatively, receive the captured images from the imaging apparatus 102 and process the captured images, and/or render a user interface based on said processing to a display for viewing by the user.

In some such embodiments, the user device 104 provides such functionality via a specially configured computer-executable program application (or "app") executed via the user device 104. The app may leverage functionality provided by the user device's hardware, firmware, and/or additional software such as the operating system. In this regard, for example, the user device 104 may utilize display hardware and corresponding software and/or firmware functionality to render data to the display. Additionally or alternatively, the user device 104 may use various communications hardware and corresponding software and/or firmware functionality to communicate with the imaging apparatus 102 and/or server 106. In some such embodiments, the user device 104 communicates with the imaging apparatus 102 utilizing one or more near-range communications implementations, such as Bluetooth or private network (e.g., WLAN) communications. Alternatively, in some embodiments, the user device 104 communicates with the imaging apparatus 102 via the communications network 112 utilizing communications methodologies suitable for communication over any range, such as via the Internet. It should be appreciated that, in some embodiments, the app executed via the user device 104 may leverage various functionality provided by the operating system of the user device 104, for example to access and control display hardware of the user device 104 and/or communications hardware of the user device 104.

The server 106 is embodied by any number of computing devices configured for data storage and processing. In some embodiments, the server 106 is embodied by one or more physical server devices, virtual server devices, and/or "cloud" servers that may be remotely located from one another. In at least one example context, the server 106 is embodied by computing hardware and/or software configured for storage, retrieval, and maintenance of data utilized in item searching and verification. For example, in some embodiments the server 106 is configured to maintain an item data object for each item to be distributed, and/or item distribution route data for any number of item distribution routes. In this regard, the server 106 may embody and/or include any number of databases embodied in physical, virtual, and/or cloud devices. In some embodiments, the server 106 provides and/or is otherwise communicable with via one or more application programming interface(s). The application programing interface(s) may provide various functionality for data retrieval and/or processing from the server 106. For example, the imaging apparatus 102 may communicate with the server 106 (directly or indirectly through the user device 104) by transmitting various specifically configured API requests over the communications network 112, and receiving data in response to such API requests.

Example Apparatuses of the Disclosure

The apparatuses, computer-implemented methods, systems, and computer program products of the present disclosure may be embodied by any of a variety of devices. For example, a method, apparatus, system, and computer program product of an example embodiment may be embodied by a fixed computing device, such as a personal computer, computing server, computing workstation, or a combination thereof. Further, an example embodiment may be embodied by any of a variety of mobile scanning devices (e.g., barcode or other scanners), mobile terminals, mobile telephones, smartphones, laptop computers, tablet computers, or any combination of the aforementioned devices.

In at least one example embodiment, the imaging apparatus 102 is embodied by one or more computing devices, such as the apparatus 200 as shown and described in FIG. 2. The apparatus 200 may include various components, such as one or more imager(s) 202, illuminator(s) 204, processor 206, activator component 208, memory 210, input/output module 212, and communications module 214. In some embodiments, one or more components are entirely optional (e.g., an aimer illuminator, additional imager(s), and/or additional illuminator(s)), and/or one or more components may be embodied in part or entirely by another component and/or system associated with the apparatus 200 (e.g., the item processing module combined in whole or in part with the processor 206).

Although the components are described with respect to functional limitations, it should be understood that the particular implementations necessarily include the use of particular hardware. It should also be understood that certain of the components described herein may include similar or common hardware. For example, two modules may both leverage use of the same processor, network interface, storage medium, or the like to perform their associated functions, such that duplicate hardware is not required for each module. The use of the term "module" and/or the term "circuitry" as used herein with respect to components of the apparatus 200 should therefore be understood to include particular hardware configured to perform the functions associated with the particular module as described herein.

Additionally or alternatively, the terms "module" and "circuitry" should be understood broadly to include hardware and, in some embodiments, software and/or firmware for configuring the hardware. For example, in some embodiments, "module" and "circuitry" may include processing circuitry, storage media, network interfaces, input/output devices, and the like. In some embodiments, other elements of the apparatus 200 may provide or supplement the functionality of the particular module. For example, the processor 206 may provide processing functionality, the memory 210 may provide storage functionality, the communications module 214 may provide network interface functionality, and the like, to one or more of the other modules.

Imager(s) 202 may include any number of imagers, each capable of capturing a particular field of view. Each imager may include a myriad of subcomponents, such as image capture optics (e.g., one or more lenses and lens housings, and/or corresponding support elements) and an image sensor configured to capture data representing light incident with the image sensor. In this regard, each imager may define a particular capturable field of view, such that exposing and readout of the image sensor produces a captured image representing the field of view defined by the imager. It should be appreciated that the construction and arrangement of the image capture optics and/or image sensor of each imager defines the range at which the field of view is best in focus. The imager(s) 202 may be activated and/or otherwise controlled independently (e.g., each including separate activation means), or in conjunction with one or more other components of the apparatus 200, such as by the processor 206 specially configured for controlling such imager(s) 202 in a desired activation sequence.

Illuminator(s) 204 may include any number of illuminators, each capable of producing an illumination at a desired intensity and/or illumination pattern. Each illuminator may include a myriad of subcomponents, such as illumination projection optics (e.g., one or more lenses and/or lens housings, and/or corresponding support elements) specially designed to produce desired illumination patterns from produced light, and an illumination source configured to produce the light for projecting through the illumination projection optics. In this regard, each illuminator may produce an illumination specially designed to illuminate a corresponding field of view with a desired illumination intensity and pattern. The illuminator(s) 204 may be activated and/or otherwise controlled independently (e.g., each including separate activation means), or in conjunction with one or more other components of the apparatus 200, such as by the processor 206 specially configured for controlling such illuminator(s) 204 in a desired activation sequence.

Activator component 208 includes hardware, software, firmware, and/or a combination thereof, for activating one or more scanning processes. In this regard, the activator component 208 may be configured to trigger activation of one or more of the imager(s) 202 and/or illuminator(s) 204, and/or for processing captured images resulting from such activation(s). In some embodiments, the activator component 208 is configured to trigger activation by transmitting one or more specially designed signals to the processor 206 indicating such activation (or similarly, deactivation). The activation signal(s) may further cause the processor 206 to transmit activation signal(s) to the imager(s) 202 and/or illuminator(s) 204 to initiate activation of such component (s). In some embodiments, the activator component 208 includes one or more physical activation components, such as an activation trigger or activation buttons, interactable by the user for triggering activation and/or triggering activation. Additionally or alternatively, the activator component 208 may include software and/or firmware modules configured for detecting one or more events indicating activation of a scanning operation. Non-limiting example events include detecting a lifting of the apparatus 200 to a scanning position, one or more particular gestures performed using the apparatus 200, and/or the like.

In some embodiments, the processor 206 (and/or coprocessor or any other processing circuitry assisting or otherwise associated with the processor) may be in communication with the memory 210 via a bus for passing information among components of the apparatus. The memory 210 may be non-transitory and may include, for example, one or more volatile and/or non-volatile memories. In other words, for example, the memory may be an electronic storage device (e.g., a computer readable storage medium). The memory 210 may be configured to store information, data, content, applications, instructions, or the like, for enabling the apparatus 200 to carry out various functions in accordance with example embodiments of the present disclosure.

The processor 206 may be embodied in any one of a myriad of ways and may, for example, include one or more processing devices configured to perform independently. Additionally or alternatively, the processor 206 may include one or more processors configured in tandem via a bus to enable independent execution of instructions, pipelining, and/or multithreading. The use of the terms "processor," "processing module," and "processing circuitry" may be understood to include a single-core processor, a multi-core processor, multiple processors internal to the apparatus, other central processing unit ("CPU"), microprocessor, integrated circuit, and/or remote or "cloud" processors.

In an example embodiment, the processor 206 may be configured to execute computer-coded instructions stored in the memory 210 or otherwise accessible to the processor. Alternatively, or additionally, the processor 206 may be configured to execute hard-coded functionality. As such, whether configured by hardware or software means, or by a combination thereof, the processor 206 may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

As one example context, the processor 206 may be configured to provide automatic item searching and verification functionality. For example, in at least one embodiment, the processor 206 is configured to receive an indication of activation, for example from the activator component 208, and/or activate the imager(s) 202 and/or illuminator(s) 204. Additionally or alternatively, the processor 206 may readout captured images from the imager(s) 202, and/or process such captured images for purposes of automatic item searching and verification. For example, in at least one embodiment the processor 206 is configured for identifying item representations and/or item information representations in the captured images, such as by performing one or more image processing algorithms to identify information from an image information representation and/or by detecting visual indicia represented in a captured image, decoding such detected visual indicia, and/or identifying the relevant items based on the decoded visual indicia. Additionally or alternatively still, in some embodiments, the processor 206 is configured for rendering one or more user interfaces, and/or generating interface elements for rendering within one or more user interfaces, such as by generating augmented reality element(s) and/or visual notifications for rendering. In some embodiments, the processor 206 performs such functions alone or in conjunction with the input/output module 212.

The communications module 214 may be any means such as a device or circuitry embodied in either hardware or a combination of hardware and software that is configured to receive and/or transmit data from/to a network and/or any other device, circuitry, or module in communication with the apparatus 200. In this regard, the communications module 214 may include, for example, at least a network interface for enabling communications with a wired or wireless communications network. For example, the communications module 214 may include one or more network interface cards, antennas, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The item processing module 216 includes hardware, software, firmware, and/or a combination thereof, configured to support automatic item searching and/or verification. The item processing module 216 may utilize processing circuitry, such as the processor 206, to perform one or more of such actions. In some embodiments, the item processing module 216 includes hardware, software, firmware, and/or a combination thereof, to retrieve data, such as target item data set(s) and/or item distribution route data, from a local storage and/or remote server, for processing. Additionally or alternatively, the item processing module 216 may include hardware, software, firmware, and/or a combination thereof for activating the imager(s) 202 and/or the illuminator(s) 204, for example for capturing an image set. Additionally or alternatively still, in some embodiments, the item processing module 216 includes hardware, software, and/or firmware configured for processing the captured images to identify and/or process item representations and/or corresponding item information representations, such as by detecting visual indicia represented within the captured images and decoding such visual indicia to identify scanned item data object(s), and/or by utilizing one or more image processing algorithms to process item information representation(s) (e.g., data on an item label). Additionally or alternatively still, the item processing module 216 in some embodiments includes hardware, software, firmware, and/or a combination thereof configured for identifying relevant items within the captured images, generating interface elements (such as augmented reality elements) associated with such items, and causing rendering of one or more user interfaces including such generated interface elements. For example, in at least one example embodiment, the item processing module 216 is configured for maintaining an augmented reality environment and causing rendering of augmented reality interface elements to a user interface including the captured image(s) augmented based on the generated interface element(s).

In some embodiments, the item processing module 216 is configured to store to, and/or retrieve from, one or more datastore(s) for storing, retrieving, and/or maintaining storage of data objects, computer-coded instructions, and/or the like to enable functionality for automatic item searching and verification. In some embodiments, the item processing module 216 alone or in combination with one or more other modules, such as the input/output module 212, is configured to generate interface elements and/or cause rendering of one or more user interfaces associated such generated interface elements and/or associated with retrieved, identified, and/or otherwise processed data objects. It should be appreciated that, in some embodiments, the item processing module 216 may include a separate processor, specially configured field programmable gate array (FPGA), or a specially configured application-specific integrated circuit (ASIC).

In some embodiments, one or more of the aforementioned components is combined to form a single module. The single combined module may be configured to perform some or all of the functionality described above with respect to the individual modules. For example, in at least one embodiment, the item processing module 216 and the processor 206 may be embodied by a single module, and/or one or more of the activator component 208 and processor 206 may be combined. Additionally or alternatively, in some embodiments, one or more of the modules described above may be configured to perform one or more of the actions described with respect to one or more of the other modules.

In at least one example embodiment, the user device 104 is embodied by one or more computing devices, such as the apparatus 300 as shown and described in FIG. 3. The apparatus 300 may include various components, such as one or processor 302, memory 304, input/output module 306, communications module 308, and item capture and processing module 310. In some embodiments, one or more components may be embodied in part or entirely by another component and/or system associated with the apparatus 300.

Although the components are described with respect to functional limitations, it should be understood that the particular implementations necessarily include the use of particular hardware. It should also be understood that certain of the components described herein may include similar or common hardware. For example, two modules may both leverage use of the same processor, network interface, storage medium, or the like to perform their associated functions, such that duplicate hardware is not required for each module. The use of the term "module" and/or the term "circuitry" as used herein with respect to components of the apparatus 200 should therefore be understood to include particular hardware configured to perform the functions associated with the particular module as described herein.

With respect to apparatus 300, components 302-308 perform functions like those of the similarly-named components of apparatus 200. Accordingly, in the interest of brevity, repeated disclosure in this respect is omitted. These components provide various functionality for retrieval, transmission, processing, and/or display of data in various functionality provided by the apparatus 300.

The item capture and processing module 310 includes hardware, software, firmware, and/or a combination thereof, configured to support automatic item searching and/or verification in conjunction with an imaging apparatus, such as the imaging apparatus 102. The item capture and processing module 310 may utilize processing circuitry, such as the processor 302, to perform one or more of such actions. In some embodiments, the item capture and processing module 310 includes hardware, software, firmware, and/or a combination thereof, to retrieve data, such as target item data set(s) and/or item distribution route data, from a local storage and/or remote server, for processing. Additionally or alternatively, the item capture and processing module 310 may include hardware, software, firmware, and/or a combination thereof for activating receiving, from an imaging apparatus, one or more captured images for processing together with the retrieved data. In some such embodiments, the item capture and processing module 310 is further configured to enable activation and/or control of the imaging apparatus, such as the imaging apparatus 102. For example, in some embodiments, the item capture and processing module 310 is configured to receive and/or otherwise retrieve captured images from an imaging apparatus, and process the captured images to detect visual indicia represented within the captured images, and/or decode such visual indicia to identify scanned item data object(s). Additionally or alternatively still, the item capture and processing module 310 in some embodiments includes hardware, software, firmware, and/or a combination thereof configured for identifying relevant items within the captured images, generating interface elements (such as augmented reality elements), and causing rendering of one or more user interfaces including such generated interface elements. For example, in at least one example embodiment, the item capture and processing module 310 is configured for maintaining an augmented reality environment and causing rendering of augmented reality interface elements to a user interface including the captured image(s) augmented based on the generated interface element(s).

In some embodiments, the item capture and processing module 310 is configured to store to, and/or retrieve from, one or more datastore(s) for storing, retrieving, and/or maintaining storage of data objects, computer-coded instructions, and/or the like to enable functionality for automatic item searching and verification. In some embodiments, the item capture and processing module 310 alone or in combination with one or more other modules, such as the input/output module 306, is configured to generate interface elements and/or cause rendering of one or more user interfaces associated such generated interface elements and/or associated with retrieved, identified, and/or otherwise processed data objects. It should be appreciated that, in some embodiments, the item capture and processing module 310 may include a separate processor, specially configured field programmable gate array (FPGA), or a specially configured application-specific integrated circuit (ASIC).

In some embodiments, one or more of the aforementioned components is combined to form a single module. In at least some embodiments, the single combined module may be configured to perform some or all of the functionality item capture and processing module 310 and the processor 302. Additionally or alternatively, in some embodiments, one or more of the modules described above may be configured to perform one or more of the actions described with respect to one or more of the other modules.

Visualization of Example Context

FIG. 4 illustrates an example visualization of an example context for item searching and verification at multiple locations along an example item distribution route, in accordance with at least one example embodiment of the present disclosure. Specifically, the visualization includes item searching and verification for a loading operation at a first, hub location 402A, and item searching and verification for several unloading operations at various delivery locations 402B, 402C and 402D along an item distribution route. The functionality for item searching and verification is performed via the apparatus 200, which may embody the imaging apparatus 102 as described above with respect to FIG. 1.

Processing begins at hub location 402A, where the user 406 is to perform a loading operation. Specifically, the user is to load a set of items (such as packages) from the unloaded item set 404 onto the delivery vehicle 408. The user 406 may be a delivery driver preparing for delivering such items along a particular item distribution route including one or more delivery points. In some embodiments, the user 406 may utilize the apparatus 200, for example embodying or otherwise integrated into the user's mobile device, to initiate an automatic item searching and verification process associated with the loading operation. In this regard, the user 406 may utilize the apparatus 200 to capture and process images of the unloaded item set 404, such that relevant items (e.g., those to be delivered along the item distribution route to be performed by the user 406) may be efficiently and accurately identified from the unloaded item set 404, and loaded onto the delivery vehicle 408.

The user 406 may engage the apparatus 200 to initiate a loading operation. In some embodiments, the user 406 interacts with the apparatus 200 to select between a first, "loading" mode and a second, "unloading" mode. In this regard, the user 406 may select the "loading" mode to initiate a loading operation. In some other embodiments, the user 406 may initiate the apparatus 200 for automatic item searching and verification, such as by initiating an app on the apparatus 200, and the apparatus 200 may automatically initiate a loading operation without specific selection by the user. In one such example context, the apparatus 200 may retrieve the device location associated with the apparatus 200, for example by utilizing location services functionality provided by the apparatus 200, and determine the device location is associated with a loading operation (e.g., by predetermining the hub location 402A is associated with a loading operation).

Upon initiating the loading operation, the apparatus 200 may provide one or more interfaces to enable the user 406 to select and/or input an item distribution route to be performed. In some embodiments, the apparatus 200 retrieves data representing predetermined possible item distribution routes that the user may be performing, and provides an interface to enable the user 406 to select an item distribution route from the retrieved set of predetermined possible item distribution routes. Upon receiving an indication of a selection by the user 406, the apparatus 200 may retrieve item distribution route data for the selected item distribution route (e.g., from a local storage or through communication with a remote server) if not retrieved at an earlier step (e.g., when retrieving possible item distribution routes for display a selection interface). Alternatively or additionally, in at least some embodiments, the user 406 may input item distribution route data for an item distribution route to be performed, for example by inputting one or more destination locations defining the item distribution route.

Upon retrieving item distribution route data representing an item distribution route to be performed by the user 406, the apparatus 200 in some embodiments identifies a target item data set representing the items to be loaded for distribution along the item distribution route. In this regard, the target item data set may include some or all data associated with the items that are to be selected from the unloaded item set 404 for loading into the delivery vehicle 408. In at least one example embodiment, the target item data set includes one or more item data objects, or a portion thereof such as an item data object identifier, corresponding to the items that located at the hub location 402A and are to be delivered along the route represented by the item delivery route data.

The user 406 may subsequently utilize the apparatus 200 to capture a set of one or more images for processing. Specifically, the user 406 may aim the apparatus 200 such that the captured images include data representations of the unloaded item set 404. Each item in the unloaded item set 404 may have an item label affixed that includes information regarding the item, such as delivery location information, delivery recipient information, recipient contact information, and/or a visual indicia (e.g., a barcode) encoding some or all information associated with the item. Conventionally, the unloaded item set 404 may be oriented such that the label for each item is appropriately oriented generally in the same direction (e.g., within 45 degrees from one another), such that the captured images may each include data representations of the item labels.

Such item labels may be processed to determine whether the item is a relevant item for distribution along the selected item distribution route. For example, a captured image may be processed to detect and decode visual indicia associated with each item represented within the captured image. In some embodiments, the apparatus decodes detected visual indicia to identify a scanned item data set, and identifies data in the scanned item data set that corresponds to relevant items from an earlier determined target item data set for the item distribution route data selected. In this regard, the apparatus 200 may determine whether each item in the scanned item data set is in the target item data set by comparing the two sets, and if an item is, the apparatus determines the scanned item data object, associated visual indicia, and thus associated item representation are all relevant. Accordingly, in some embodiments, the apparatus 200 is configured to generate an interface element that enables visually distinguishes the relevant items in the unloaded data set, for example by causing rendering of an augmented reality environment comprising the captured image augmented by the generated augmented reality elements. It should be appreciated that to maintain the augmented reality environment and corresponding renderings, the apparatus 200 may continue to capture a plurality of captured images, and update the rendering based on each subsequent captured image to include newly generated and/or previously generated augmented reality elements for relevant items as the user moves the apparatus 200 for scanning. In some contexts, the apparatus 200 may provide visual and/or auditory instructions to the user 406 requesting the user move the apparatus 200 in a desired motion (e.g., in a small circle) to ensure the entire applicable field of view is captured and/or to improve the likelihood of capturing at least one image data object of sufficient clarity to enable detection and/or decoding of visual indicia therein.

The user 406 may view the rendered user interface comprising the augmented reality, and utilize it to readily determine the items for loading in an efficient and accurate manner. The user 406 may then load each item onto the delivery vehicle 408, and in some embodiments subsequently scan the visual indicia of each item to indicate the item is being loaded. In some such implementations, based on the subsequent scans, the apparatus 200 may detect when the user has begun loading an improper item (e.g., an item not to be delivered along the selected item distribution route), and notify the user via one or more rendered notifications. Additionally, if the user fails to load one or more items earlier detected before the user 406 indicates beginning the route, or detecting such an event, the apparatus 200 may detect that a required item has not been loaded and similarly notify the user via one or more rendered notifications. When the user 406 has completed the loading operation (e.g., by loading all relevant items for the item distribution route onto the delivery vehicle 408), the current loading operation is terminated.

In some embodiments, the apparatus 200 is configured to determine relevant items missed during the loading operation. For example, the apparatus 200 may determine a relevant item set associated with the unloaded item set 404 through one or more captured images. Subsequently, in a circumstance where the user 406 scans each item as it is loaded into the delivery vehicle 408, the apparatus 200 may identify one or more incorrect actions that occur during the loading operation. For example, in at least one example context, the apparatus 200 detects when an improper item is scanned indicating loading. Additionally or alternatively, in at least one example context, the apparatus 200 detects when the user 406 has begun the item distribution route or otherwise indicated termination of the loading operation, for example via user input, without loading all detected and/or otherwise identified relevant items from the unloaded item set 404. In this regard, should an improper item be detected and/or a missed item be detected during loading, the apparatus 200 may generate, provide, and/or render one or more notifications to the user.

The user 406 may then begin the item distribution route, such as by travelling in the delivery vehicle 408 to the first location of the item distribution route, such as the first location 402B. At the first location 402B, the user 406 may initiate an unloading operation via the apparatus 200. In this regard, the user 406 may utilize the apparatus 200 to capture images of the loaded item set 410A (including the relevant items loaded at the hub location 402A) and process such captured images to identify items to be unloaded at the first location 402B. In some embodiments, the apparatus 200 generates augmented reality elements for the relevant items detected in the captured images, and causes rendering of a user interface based on an augmented reality environment, such as including the captured images together with the generated augmented reality elements for the relevant items such that the user 406 may utilize the user interface to identify such items. As illustrated, for example, the user 406 may identify the relevant item set 412A and unload it from the loaded item set 410A for delivery at the first location. It should be appreciated that any portion of the loaded item set 410A may be appropriate for unloading at a certain location, and in some contexts (such as where an item distribution route includes only one location).

In some such embodiments, the user utilizes the apparatus 200 to initiate an unloading mode, such as by selecting the unloading mode via an application executed on the apparatus 200. Alternatively or additionally, in some embodiments, the apparatus 200 is configured to identify a device location for the apparatus 200, and automatically determine that the device location is along an item distribution route to automatically initiate an unloading mode. The apparatus 200 retrieves, either from a local storage or remote server, a target item data set associated with item distribution route data where the target item data set comprises item data objects for items to be unloaded at the current location 402B (e.g., the first location). In this regard, in some embodiments, the apparatus 200 retrieves item distribution route data for all items to be unloaded along the route, and utilizes the current identified device location to retrieve the target item data set for those items to be unloaded at the current device location. In some embodiments where the device location is not identified during initiation of the unloading mode, the apparatus 200 identifies the device location during retrieval of the target item data set.

The user 406 may subsequently utilize the apparatus 200 to capture the set of one or more images for processing. Specifically, the user 406 may aim the apparatus 200 such that the captured images include data representations of the loaded item set 410A on the delivery vehicle 408. Each item again includes the item label affixed thereto, and may be oriented such that the item label is visible from the perspective of the user 406 unloading the items. It should be appreciated that only a portion of the loaded item set 410A may be visible at one or more location(s), such as where the items to be distributed later in the route are located further back in the delivery vehicle 408 and the items to be distributed earlier in the route are located closer to the opening of the delivery vehicle 408 for unloading by the user 406.

Such item labels may again be processed to determine whether each item is a relevant item for unloading at the current location along the item distribution route. For example, a captured image may be processed to detect and decode visual indicia associated with each item represented within the captured image. In some embodiments, the apparatus 200 decodes detected visual indicia to identify a scanned item data set, and identifies data in the scanned item data set that corresponds to relevant items from an earlier determined target item data set associated with at least a portion of the item distribution route data (e.g., those associated with the current location along the route). In this regard, the apparatus 200 may determine whether each item in the scanned item data set is in the target item data set by comparing the two sets, and if an item is relevant, the apparatus determines the scanned item data object, associated visual indicia, and thus associated item representation are all relevant. Accordingly, in some embodiments, the apparatus 200 is configured to generate an interface element that visually distinguishes the relevant items in the loaded item set 410A, for example by causing rendering of an augmented reality environment comprising the captured image augmented by the generated augmented reality elements for such relevant items. It should be appreciated that to maintain the augmented reality environment and corresponding renderings, the apparatus 200 may continue to capture a plurality of captured images, and update the rendering based on each subsequent captured image to include newly generated and/or previously generated augmented reality elements for relevant items as the user moves the apparatus 200 for scanning. In some contexts, the apparatus 200 may provide visual and/or auditory instructions to the user 406 requesting the user move the apparatus 200 in a desired motion (e.g., in a small circle) to ensure the entire applicable field of view is captured and/or to improve the likelihood of capturing at least one image data object of sufficient clarity to enable detection and/or decoding of visual indicia therein.

The user 406 may view the rendered user interface comprising the augmented reality, and utilize it to readily determine the items for unloading in an efficient and accurate manner. The user 406 may then load each item onto the delivery vehicle 408, and in some embodiments subsequently scan the visual indicia of each item to indicate the item is being unloaded. In some such implementations, based on the subsequent scans, the apparatus 200 may detect when the user has begun unloading an improper item (e.g., an item to be delivered at another location along the current item distribution route), and notify the user via one or more rendered notifications. Additionally, if the user fails to unload one or more items identified in the target item data set before the user 406 indicates continuing of the route, or the apparatus 200 detecting such an event, the apparatus 200 may detect that a relevant item has not been unloaded and similarly notify the user via one or more rendered notifications. When the user 406 has completed the unloading operation (e.g., by unloading all relevant items for the current first location 402B), the user 406 may proceed to the next location in the item distribution route, such as the second location 402C.

The user 406 may initiate subsequent unloading operations for each remaining location along the item distribution route. For example, as illustrated, the user 406 may repeat the above-described operations with respect to the first location 402B to complete an unloading operation at the second location 402C. As illustrated, the user 406 utilizes the apparatus 200 to identify the relevant items from the remaining loaded item set 410B, for example by capturing images and causing rendering of a corresponding augmented reality environment that visually distinguishes the relevant items, and unload the relevant item set 412B from the remaining loaded item set 410B at the second location 402C. In this regard, in some such embodiments, the apparatus 200 is configured to identify the device location in real-time, and retrieve an updated target item data set for a new location along an item delivery route. For example, as illustrated, the user may repeat the above-described operations with respect to the first location 402B and second location 402C to complete an unloading operation at the third location 402D. As illustrated, the user 406 utilizes the apparatus 200 to identify the relevant items from the remaining loaded item set 410C, for example by capturing images of the remaining loaded item set 410C and causing rendering of a corresponding augmented reality environment that visually distinguishes the relevant items, and unload the relevant item set 412C from the remaining loaded item set 410C at the third location 402D. In one example context, such as where the third location 402D represents the final stop along the item distribution route, no items may remain in the delivery vehicle 408 after unloading the relevant item set 412C at the third location 402D. The user 406 may then return to the hub location 402A via the delivery vehicle 408.

In some embodiments, the apparatus 200 is additionally or alternatively configured to identify items that the user 406 has missed unloading. For example, the user 406 may unload one or more item(s) at the first location 402B after terminating use of the apparatus 200, such that the apparatus 200 is not aware that the user 406 failed to unload that is relevant for unloading at the first location 402B. In some such embodiments, the apparatus 200 may identify the missed item during a subsequent unloading operation (e.g., at the second location 402C), for example by decoding the visual indicia on the item label to identify a scanned item data object representing the item data object for the item and determining the item data object is associated with the earlier first location 402B. In such circumstances, the apparatus 200 may generate one or more notifications for rendering to a user interface to notify the user of the missed item. Additionally or alternatively, in some embodiments, the apparatus 200 may generate one or more interface elements, such as an alternative reality interface element, and cause rendering of a user interface including such interface elements to visually distinguish the representation of the missed item from the other items of the remaining loaded item set.

Example Images and Image Augmentations of the Present Disclosure

FIG. 5 illustrates an example captured image for processing, in accordance with at least one example embodiment of the present disclosure. Specifically, the captured image may be processed for purposes of identifying relevant items for unloading and/or loading. The captured image 500 may be captured via an imaging apparatus embodied by the apparatus 200, for example using at least one imager of the apparatus 200. The captured image 500 may be one of a plurality of captured images in a captured image set, for example an image set captured in real-time to maintain an augmented reality environment.

The captured image 500 comprises a plurality of item representations 502A-502C. Each of the item representations 502A-502C corresponds to an item that may be selected for loading or unloading. As illustrated, each of the items includes an item label that includes various information associated with the item (e.g., a recipient name, delivery location, contact information, and a visual indicia), and item label representations 504A-504C are captured in the captured image 500. The visual indicia 506A-506C may encode various data associated with each item, for example all properties of an item data object representing the item or a portion thereof utilized to determine whether the item is relevant, such as at least an identifier corresponding to the item and/or a delivery location for the item.

The captured image 500 may be processed to decode each visual indicia represented in the captured image 500, and identify whether the scanned item data object decoded therefrom indicates the visual indicia and item representation correspond to a relevant item for loading or unloading at a current location. For example, the scanned item data object decoded from each visual indicia may be compared to a target item data retrieved from a local storage or remote server. Alternatively or additionally, the scanned item data object may be transmitted to a remote server, for example via one or more APIs, alone or together with an identified device location to determine whether the data corresponds to a relevant item for loading or unloading at the current location.

In some embodiments, additional or alternative processing is performed in circumstances where the apparatus fails to detect or decode a visual indicia. For example, in at least one example embodiment, the apparatus 200 is configured to perform image processing to process the text located on the item labels 504A-504C, and identifies the scanned item data object based on such image processing. In at least one example embodiment, the apparatus 200 is configured to perform optical character recognition ("OCR") to extract individual text values and/or generate the scanned item data object corresponding to the item representation based on text parsed from the representation of the item label. In this regard, item data such as an item identifier, a delivery destination, a recipient information, and/or the like may be identified without processing the visual indicia specifically.

In a circumstance where a scanned item data object indicates that the corresponding visual indicia and item representation is associated with a relevant item, the apparatus may generate an interface element visually distinguishing the item representation for the relevant item and cause rendering of the interface elements. For example, in some embodiments, the apparatus 200 maintains an augmented reality environment, such that each of the item representations and/or visual indicia represented in the captured image corresponds to an item position. The apparatus 200 may, in some such embodiments, cause rendering of the captured image augmented based on the generated augmented reality elements, such that the user of the apparatus 200 may utilize the user interface comprising the augmented reality to efficiently and accurately identify the relevant items. An example user interface rendered in a loading mode based on a captured image and augmented reality interface elements is illustrated and described with respect to FIG. 6. An example user interface rendered in an unloading mode based on a captured image and augmented reality interface elements is illustrated and described with respect to FIG. 7.

FIG. 6 illustrates an example user interface including a rendering of an augmented reality environment including augmented reality elements for a loading operation, in accordance with at least one example embodiments of the present disclosure. Specifically, FIG. 6 illustrates example user interface 600 comprising a captured image further comprising item representations 602A-602C. The user interface may be rendered when the imaging apparatus, for example the apparatus 200, is set in a loading mode automatically or by a user. As illustrated, the captured image is augmented based on augmented reality elements 604A-604C. Each of the augmented reality elements 604A-604C is associated with an item representation of the item representations 602A-602C, for example to indicate that the item should be selected for loading into a delivery vehicle. As illustrated, the augmented reality elements 604A-604C each indicate a position in the delivery vehicle to which the item should be loaded. For example, the augmented reality element 604A indicates the corresponding item represented by the item representation 602A should be loaded into the front of the delivery vehicle, the augmented reality element 604B indicates the corresponding item represented by item representation 602B should be loaded in the back of the delivery vehicle, and the augmented reality element 604C indicates the corresponding item represented by item representation 602C should be loaded into the middle of the delivery vehicle. In some embodiments, the apparatus 200 utilizes the item information scanned from the item label to generate the appropriate augmented reality element. For example, in an example context, the apparatus 200 may identify the delivery location associated with the item representation 602A (e.g., by decoding the visual indicia and/or label) is associated with a first delivery location of a selected item distribution route, and thus generate an augmented reality element specifying a "front" placement for the item. Similarly, the apparatus 200 may identify a delivery location and/or stop number associated with the item representation 602B that is a final stop of an item distribution route, and thus generate an augmented reality element specifying a "back" placement for the item. Similarly still, the apparatus 200 may identify a delivery location and/or stop number associated with the item representation 602C that is between the first and last delivery locations of a selected item distribution route, and thus generate an augmented reality element specifying a "middle" placement for the item. In other embodiments, the augmented reality elements are color-coded based on position recommendation, indicate a recommended numerical order for loading, include the delivery location for each item, and/or include additional information for viewing by the user. In yet other embodiments, the augmented reality element includes other information useful for loading the item into a delivery vehicle. For example, in a circumstance where the item data object includes or is associated with a rack location corresponding to a position on a rack within a delivery vehicle to which the item is to be loaded.

In some embodiments, each of the augmented reality elements 604A-604C is positioned within an augmented reality environment based on an item position corresponding to the item representation 602A-602C, item label associated therewith, and/or data included on the item label (e.g., a position associated with the visual indicia to be decoded). In some embodiments, for example, the apparatus 200 may determine an item position corresponding to a determined center point for an item in the augmented reality environment. Alternative or additionally, in some embodiments, the apparatus 200 determines an item position corresponding to the position of the item label or visual indicia associated with an item. In this regard, in some embodiments, the apparatus 200 renders the augmented reality element generated for an item based on the item position, such as at the item position or based on a defined offset from the item position. In this manner, the augmented reality element is positioned so that the user may associate the augmented reality element with the item to which that augmented reality element corresponds.

FIG. 7 illustrates an example user interface including a rendering of an augmented reality environment including at least one augmented reality element for an unloading operation, in accordance with at least one example embodiments of the present disclosure. Specifically, FIG. 7 illustrates example user interface 700 comprising a captured image further comprising item representations 702A and 702B. The user interface may be rendered when the imaging apparatus, for example the apparatus 200, is set to an unloading mode automatically or by a user. As illustrated, the captured image is augmented based on augmented reality elements 704A and 704B. Each of the augmented reality elements 704A and 704B is associated with an item representation of the item representations 702A and 702B, for example to indicate that the item should be selected for unloading at the current location. As illustrated, the augmented reality elements 704A and 704B each indicate that the item corresponding to the associated item representation 702A or 702B are relevant for unloading at the current location. For example, as indicated, each of the augmented reality elements 704A and 704B indicate that the corresponding item represented by the item representations 702A and 702B should be "picked" for unloading at the current location. In some embodiments, the apparatus 200 utilizes the item information canned from the item label to generate the appropriate augmented reality element(s). For example, in an example context, the apparatus 200 may identify the current device location matches a delivery location identified from the item label (e.g., via an identified scanned item data object), and thus generate augmented reality elements for each of those items. In other embodiments, one or more of the augmented reality elements is generated including at least a portion of the item data object, such as a portion of the delivery location information (e.g., an apartment number, floor number, or other sub-address in the context of distribution to a multi-story building, multiple buildings, and/or the like), recipient information, and/or the like that may be useful to the user during unloading.

In some embodiments, each of the augmented reality elements 704A and 704B is positioned within the augmented reality environment similarly based on item positions corresponding to each of the item representations 702A and 702B, item labels associated therewith, and/or data included on the item label (e.g., a position associated with the visual indicia on the item label). The apparatus 200 renders the augmented reality element generated for an item based on the determined item position, such as at the item position, such as to locate the augmented reality element at the item position or based on a defined offset from the item position. In this manner, the augmented reality element is positioned so that the user may associated the augmented reality element with the item to which the augmented reality element corresponds.

Example Processes of the Present Disclosure

Having described example systems, apparatuses, and contexts with visualizations associated with embodiments for example automatic item searching and verification, example flowcharts including various operations performed in processes in accordance with the present disclosure will now be discussed. One or more of the described processes may be performed by the above-described systems and/or apparatuses, such as the apparatuses 200 and/or 300. It should be appreciated that each of the flowcharts depicts an example computer-implemented process that may be performed by one or more of the above described apparatuses, systems, and/or devices, for example using one or more of the components described herein. The blocks of each process may be arranged in any of a number of ways, as depicted and described herein or otherwise that enables the data processing described. In some such embodiments, one or more blocks of a first process may occur in-between one or more blocks, or otherwise operate as a sub-process, of a second process. Additionally or alternatively, the process may include some or all of the steps described and/or depicted, including one or more optional blocks in some embodiments. In regards to the below described flowcharts, one or more of the depicted blocks may be optional in some, or all, embodiments of the present disclosure. Optional blocks are depicted with broken (or "dashed") lines. Similarly, it should be appreciated that one or more of the operations of each flowcharts may be combinable, replaceable, and/or otherwise altered as described herein.

FIG. 8 illustrates a flowchart including example operations of an example process 800 for automatic item searching and verification, in accordance with at least one example embodiment of the present disclosure. In this regard, the example process 800 may be performed by one or more specially configured apparatuses, such as an imaging apparatus embodied by the apparatus 200 and/or a user device embodied by the apparatus 300. In some embodiments, the specially configured apparatus include and/or otherwise is in communication with one or more other apparatuses, systems, devices, and/or the like, to enable performance of one or more of the operations as depicted and described. For example, the apparatus 200 and/or apparatus 300 may be in communication with one or more remote server(s), and/or the apparatus may communicate with an imaging apparatus or user device to facilitate one or more image capture operations and/or image processing operations.

As illustrated, the example process 800 begins at optional block 802. In some embodiments, the example process begins in response to one or more user actions indicating initiation of a loading and/or unloading process. For example, in at least one example embodiment, the process 800 begins in response to user interaction with an activator component of an apparatus, for example to indicate the user desires to begin item scanning operations.

At block 802, the apparatus includes means, such as one or more of the modules 202-216 and/or 302-310, to identify a device location. The device location represents the current location where the apparatus is located. In some embodiments, the device location is identified using locations services circuitry and/or functionality to identify a current geolocation of the apparatus, the methodologies including, without limitation, GPS location services, cell tower-based location services, wireless network-based location services, other triangulation-based location services, and/or the like. In at least one example embodiment, the device location is identified based on a manual input provided by a user of the apparatus. For example, in some embodiments, the device location is identified from an address input by the user, and/or selected from various locations represented within item distribution route data embodying an item distribution route.

At block 804, the apparatus includes means, such as one or more of the modules 202-216 and/or 302-310, to retrieve a target item data set associated with item distribution route data. The item distribution route data may correspond to an item distribution route to be performed by a user of the apparatus. In this regard, the item distribution route data may be selected by user, for example from a predetermined list of possible item distribution routes each corresponding to item distribution route data representing the route. In this regard, the item distribution route data may include or identify a set of destination locations representing the route, and/or may include or identify an item data object set including item data objects for items to be delivered at each location. Accordingly, when the apparatus is in a loading mode for a loading operation, the target item data set may be identified such that all items to be delivered at locations represented in the item distribution route data are represented by item data object(s) in the target item data set. In some embodiments, the device location is utilized to determine relevant item data objects for particular item distribution route data to be loaded at the current location. Such data may be identified from a remote server, for example where the remote server is configured to store current locations associated with various item data objects for distribution.

In a circumstance where the apparatus is in an unloading mode for an unloading operation, the target item data set may be identified such that all items to be delivered at a current location (e.g., the identified device location at block 802) are represented by item data object(s) in the target item data set. In some embodiments, the user selects an operational mode (e.g., a loading mode or an unloading mode) via the apparatus after initiation. In other embodiments, the user initiates the apparatus in one of the operational modes (e.g., utilizing launch parameters and/or by initiating one of a plurality of applications each associated with a particular operational mode).

In some embodiments, the target item data set and/or item distribution route data are retrieved from a local storage of the apparatus. In other embodiments, the target item data set and/or item distribution route data are retrieved from a remote device, such as a remote server. The remote server embody a cloud server and/or other remote accessible computer associated with an entity performing the item distribution. In some embodiments, the apparatus is configured to directly access the data stored by the remote server. In other embodiments, the apparatus is configured to access the data stored by the remote server via use of one or more APIs. For example, the remote server may provide the API for purposes of accessing information stored by the remote server and/or performing one or more processing and/or pre-processing operations associated with such data.

At block 806, the apparatus includes means, such as one or more of the modules 202-216 and/or 302-310, to receive a captured image comprising an item representation set and an item information representation set associated with the item representation set. In some such embodiments, each item representation of the item representation set is associated with an item position in an augmented reality environment. The apparatus may maintain the augmented reality environment such that objects within the captured image(s) are associated with such positions based on a setup stage of the augmented reality environment. In some embodiments, the apparatus is configured to receive the captured image from an associated imaging apparatus, for example via one or more wireless and/or wired networks enabling communication between the apparatus and a corresponding imaging apparatus. Alternatively or additionally, in some embodiments, the apparatus is configured to capture, using an imaging apparatus, a captured image comprising an item representation set and an item information representation set associated with the item representation set. In some such embodiments, the imaging apparatus is embodied by a subcomponent, engine, and/or the like, of the apparatus, as described herein. The imaging apparatus may be a single imager imaging apparatus, a dual-imager imaging apparatus (a near-far imaging apparatus, for example), a multi-imager imaging apparatus, and/or the like. As used herein, to "capture" should be understood to include directly triggering and/or otherwise activating an imaging apparatus to produce the image data object, and includes indirectly receiving such image data object through communication with an imaging apparatus (e.g., an imaging apparatus external to the apparatus that processes the image data objects).

In some embodiments, the captured image is one of a captured image set captured by the apparatus. For example, in at least one embodiment, the apparatus utilizes one or a plurality of imagers to capture the image and/or captured image set, such as at least a near imager and a far imager, to determine the image including one or more representations best in focus for further processing. In some embodiments, the apparatus receives the captured image or a captured image set from a separate device such as an imaging apparatus. In some such embodiments, the apparatus does not capture or otherwise cause capture of the captured image data object or captured image set, and may receive the captured image(s) based on action initiated via the imaging apparatus. It some example embodiments, subsequent capture operations are performed by a myriad of imaging apparatuses, such that a single apparatus need not perform all capture operations. In some embodiments, a single apparatus performs all capture operations described herein.

In some embodiments, the apparatus is configured to detect each item representation, the associated item representation, and/or one or more sub-elements of the item information representation, from the captured image. In some embodiments, for example where the item information representation comprises an item label representation, the apparatus may detect the item label and/or specific text elements thereon, such as an identifier and/or delivery location thereon, and utilize OCR or other image processing methodologies to identify such image data for further processing. In other embodiments, for example where the item information representation embodies a visual indicia, the apparatus is configured to detect the visual indicia (such as on the item label) for further processing by decoding the visual indicia. In this regard, the captured image may include an item representation and/or item information representation for each item within the field of view of the imaging apparatus during the capture operation.

The augmented reality environment is maintained by the apparatus for purposes of enabling rendering of augmented reality elements together with captured images, such that resulting user interfaces may be provided representing the augmented reality for viewing by the user. In some embodiments, the apparatus configures the augmented reality environment at an earlier step (e.g., upon initialization of the apparatus and/or launch of a corresponding app). The apparatus may process the captured image to identify item positions associated with the various representations for purposes of positioning augmented reality elements within the augmented reality environment, for example for purposes of positioning information to be rendered on top of or otherwise in a position associated with a particular item representation.

In some embodiments, the apparatus receives at least the captured image from the imaging apparatus. For example, the apparatus may receive the captured image over one or more communications networks (e.g., over a Bluetooth connection, wireless LAN or Internet connection, and/or the like). In some such embodiments, the imaging apparatus may be configured merely for image capture, and the apparatus separate from the imaging apparatus configured for processing such images. In this regard, the imaging apparatus may be constructed with minimal processing hardware relative to the processing apparatus. In other embodiments, the imaging apparatus is configured for both capture and processing, and in this regard may perform all operations of the process 800 via the single apparatus.

At block 808, the apparatus includes means, such as one or more of the modules 202-216 and/or 302-310, to identify, from an item information representation of the item information representation set, a scanned item data object corresponding to the item representation associated with the item information representation. In some embodiments, the apparatus processes item information representations in a predefined order, such as top to bottom, biggest representation in the image to smallest, or the like. In some embodiments, the apparatus is configured to extract text elements from the item information representation, for example using OCR or other image processing methodologies, to identify the scanned item data object from data rendered on an item label. Alternatively or additionally, in some embodiments, the apparatus extracts an item data object identifier from the item information representation and utilizes the item data object identifier to identify the scanned item data object, for example by requesting the scanned item data object corresponding to the item data object identifier and receiving the scanned item data object in response to the request.

Alternatively or additionally, in at least some embodiments, the item information representation embodies or includes a visual indicia, and the apparatus is configured to decode the visual indicia to identify the scanned item data object. For example, in some embodiments, the visual indicia encodes the scanned item data object embodying some or all of the item data object for the item corresponding to the item information representation. The visual indicia may encode, in some embodiments, an item data object identifier, a delivery location, delivery recipient, and/or the like. In this regard, in some embodiments, the apparatus decodes the visual indicia to identify the scanned item data object directly. Additionally or alternatively in some embodiments, the apparatus decodes the visual indicia to identify an item data object identifier that may be used to identify the scanned item data object embodying the item data object corresponding to the visual indicia, such as by utilizing the item data object identifier to retrieve the scanned item data object from a local datastore and/or remote server.

In some embodiments, the scanned item data object represents item data objects for unloaded and/or loaded items. For example, in an unloading mode, the scanned item data objects may correspond to an item set currently loaded on a delivery vehicle (e.g., a loaded item set). In a loading mode, the scanned item data objects may correspond to, and be processed by the apparatus as, an item set to be loaded onto a delivery vehicle (e.g., an unloaded item set). In this regard, in at least one example embodiment, the apparatus is configured to process the target item data set, and/or otherwise generate appropriate data such as augmented reality elements, based on whether the whether the apparatus is in a loading mode or unloading mode.

At block 810, the apparatus includes means, such as one or more of the modules 202-216 and/or 302-310, to determine that the scanned item data object comprises a relevant item data object based on at least the target item data set associated with the item distribution route data, wherein the relevant item data object corresponds to the item representation. In some embodiments, while in a loading mode, the apparatus is configured to determine the scanned item data object comprises a relevant item data object by determining the scanned item data object corresponds to an item data object in the target item data set. In this regard, the apparatus may determine that the scanned item data object is relevant by comparing an item data object identifier from the scanned item data object with the identifiers for the item data objects in the target item data object set. Alternatively or additionally, in some embodiments, the apparatus may determine whether the scanned item data object embodies or indicates a delivery location that is represented in selected item distribution route data. In some embodiments, while in an unloading mode, the apparatus is configured to determine that the scanned item data object comprises a relevant item data object by determining the scanned item data object corresponds to an item data object in the target item data set associated with the device location. For example, the apparatus may determine that the scanned item data object is relevant by comparing an item data object identifier from the scanned item data object with the identifiers for the item data objects in the target item data set associated with the device location. Alternatively or additionally, in some embodiments, the apparatus may determine whether the scanned item data object embodies or includes a delivery location that matches the device location earlier identified.

At block 812, the apparatus includes means, such as one or more of the modules 202-216 and/or 302-310, to generate an augmented reality element corresponding to the relevant item data object. In some embodiments, the apparatus generates the augmented reality element based on a predefined augmented element template, for example such that the generated augmented reality element matches all other generated augmented reality elements. Additionally or alternatively, in some embodiments, the apparatus generates the augmented reality element based on one or more data values for the relevant item data object. In some embodiments, for example, the augmented reality element is based on a delivery location for the relevant item data object and/or item distribution route data, such as based on the number of stops before reaching the delivery location for the item, based on whether the delivery location is early in the route or later in the route, based on a position within a delivery vehicle the item should be loaded, or the like. Additionally or alternatively still, in some embodiments, the augmented reality element is generated to include one or more data values of the relevant item data object, such as to include the delivery location or sub-address therein (e.g., an apartment or building number), recipient information (e.g., recipient name), or the like. In other embodiments, the augmented reality element includes one or more other data values associated with the item data object, which may correspond to any of a myriad of parcel details, recipient information, delivery details, and/or the like.

At block 814, the apparatus includes means, such as one or more of the modules 202-216 and/or 302-310, to cause rendering, to a user interface, of the captured image augmented based on at least the augmented reality element, wherein the augmented reality element is rendered based on a first item position associated with the item representation corresponding to the augmented reality element. In this regard, the user interface represents the augmented reality environment, comprising the representations of the captured image together with the augmented reality element(s). In this regard, the augmented reality element may be positioned at the item position such that the user may determine, from the augmented reality element rendered at the item position, that the augmented reality element corresponds to a particular item representation for a relevant item. For example, in some embodiments the augmented reality element is positioned at the location of the item label, positioned at the location of a visual indicia on the item label, positioned such that the augmented reality element is rendered on top of the item label. Alternatively or additionally, in some embodiments, the augmented reality element is rendered based on a defined offset from the item position, for example such that the augmented reality element is rendered above the item representation in the user interface.

In some embodiments, the apparatus is configured to maintain the augmented reality environment and/or generated augmented reality elements. For example, the apparatus may continue to continue to capture images, process said capture images, and update the rendered user interface based on subsequently captured images and newly generated augmented reality elements. In this regard, the user may move the apparatus to ensure that all items are represented as focused in at least one captured image for processing, and/or to enable augmented reality elements to be generated and rendered in circumstances where any of the items are determined relevant. In this regard, the process 800 and/or a sub-process thereof, such as at least blocks 806-814, may be repeated for any number of captured images to maintain the augmented reality environment and update the user interface accordingly as relevant items are identified.

FIG. 9 illustrates a flowchart including additional example operations of an example process 900 for automatic item searching and verification, in accordance with at least one example embodiment of the present disclosure. Specifically, FIG. 9 illustrates an example process for identify a scanned item data object from an item information representation, for example where the item information representation comprises visual indicia. In this regard, the example process 900 may be performed by one or more specially configured apparatuses, such as an imaging apparatus embodied by the apparatus 200 and/or a user device embodied by the apparatus 300. In some embodiments, the specially configured apparatus include and/or otherwise is in communication with one or more other apparatuses, systems, devices, and/or the like, to enable performance of one or more of the operations as depicted and described. For example, the apparatus 200 and/or apparatus 300 may be in communication with one or more remote server(s), and/or the apparatus may communicate with an imaging apparatus or user device to facilitate one or more image capture operations and/or image processing operations.

As illustrated, the example process 900 begins at block 902. In some embodiments, the block 902 occurs after performance of one or more blocks of another process, such as the process 800. For example, as illustrated, block 902 may begin after block 806 as depicted and described with respect to process 800. Alternatively or additionally, the process 900 may end after block 904, or in some embodiments continues to one or more blocks of another process. For example, as illustrated, in some embodiments the process returns to block 810 as depicted and described with respect to the process 800 upon completion of the process 900 at block 904.

At block 902, the apparatus includes means, such as one or more of the modules 202-216 and/or 302-310, to detect a visual indicia in the captured image. In some embodiments, the apparatus is configured to detect a visual indicia utilizing one or more visual indicia detection algorithms. In at least one example context, the apparatus is configured to detect a barcode represented on an item label, for example utilizing a barcode detection algorithm. In other embodiments, the apparatus may utilize a QR code detection algorithm or other algorithm to detect one or more representation of a machine-readable symbology represented in the capture image.

At block 904, the apparatus includes means, such as one or more of the modules 202-216 and/or 302-310, to decode the visual indicia to identify the scanned item data object. In this regard, the apparatus is configured to utilize one or more visual indicia decoding algorithms to decode the scanned item data object encoded by the visual indicia. In this regard, the visual indicia may encode an item data object or portion of information thereof. For example, in some embodiments, the visual indicia encodes an item data object identifier, and/or other information that the apparatus utilizes to identify and/or otherwise retrieve the scanned item data object from a local or remote datastore. Alternatively or additionally, in some embodiments, the visual indicia encodes information embodying the scanned item data object entirely, such as where the visual indicia embodies some or all information associated with the item, which may include information similarly rendered on a corresponding item label.

FIG. 10 illustrates a flowchart including additional example operations of an example process 1000 for automatic item searching and verification, in accordance with at least one example embodiment of the present disclosure. Specifically, FIG. 10 illustrates an example process for identifying a scanned item data object from an item information representation, for example where the item information representation comprises an item label representation. In this regard, the example process 1000 may be performed by one or more specially configured apparatuses, such as an imaging apparatus embodied by the apparatus 200 and/or a user device embodied by the apparatus 300. In some embodiments, the specially configured apparatus include and/or otherwise is in communication with one or more other apparatuses, systems, devices, and/or the like, to enable performance of one or more of the operations as depicted and described. For example, the apparatus 200 and/or apparatus 300 may be in communication with one or more remote server(s), and/or the apparatus may communicate with an imaging apparatus or user device to facilitate one or more image capture operations and/or image processing operations.

As illustrated, the example process 1000 begins at block 1002. In some embodiments, the block 1002 occurs after performance of one or more blocks of another process, such as the process 800. For example, as illustrated, block 1002 may begin after block 806 as depicted and described with respect to process 800. Alternatively or additionally, the process 1000 may end after block 1004, or in some embodiments continues to one or more blocks of another process. For example, as illustrated, in some embodiments the process returns to block 810 as depicted and described with respect to the process 800 upon completion of the process 1000 at block 1004.

At block 1002, the apparatus includes means, such as one or more of the modules 202-216 and/or 302-310, to detect an item label in the captured image. In some embodiments, the apparatus is configured to utilize an item label detection algorithm specifically designed for detecting the item label. In some such embodiments, the apparatus is configured to detect the boundaries of the item label to extract the data representing the item label from the captured image.

At block 1004, the apparatus includes means, such as one or more of the modules 202-216 and/or 302-310, to extract, using an optical character recognition image processing algorithm, information to identify the scanned item data object. In some embodiments, the apparatus utilizes OCR to detect text rendered on the item label. In some embodiments, the text detected therein embodies the scanned item data object. In other embodiments, the text detected therein is utilized to identify and/or otherwise retrieve the scanned item data object, for example where the data extracted via OCR embodies an item data object identifier utilized to retrieve the item data object from a local storage or a remote server.

FIG. 11 illustrates a flowchart including additional example operations of an example process 1100 for automatic item searching and verification, in accordance with at least one example embodiment of the present disclosure. Specifically, FIG. 11 illustrates an example process to generating an additional augmented reality element, for example in a circumstance where a captured image includes a plurality of relevant visual indicia. In this regard, the example process 1100 may be performed by one or more specially configured apparatuses, such as an imaging apparatus embodied by the apparatus 200 and/or a user device embodied by the apparatus 300. In some embodiments, the specially configured apparatus include and/or otherwise is in communication with one or more other apparatuses, systems, devices, and/or the like, to enable performance of one or more of the operations as depicted and described. For example, the apparatus 200 and/or apparatus 300 may be in communication with one or more remote server(s), and/or the apparatus may communicate with an imaging apparatus or user device to facilitate one or more image capture operations and/or image processing operations.

As illustrated, the example process 1100 begins at block 1102. In some embodiments, the block 1102 occurs after performance of one or more blocks of another process, such as the process 800. For example, as illustrated, block 1102 may begin after block 812 as depicted and described with respect to process 800. Alternatively or additionally, the process 1100 may end after block 1108, or in some other embodiments continues to one or more blocks of another process.

At block 1102, the apparatus includes means, such as one or more of the modules 202-216 and/or 302-310, to identify, from a second item information representation of the item information representation set, a second scanned item data object corresponding to a second item representation associated with the second item representation. In this regard, the second item information representation corresponds to the second item representation, for example where the second item information representation embodies an item label on the second item or a visual indicia on the second item label. The second item information representation may otherwise be processed in a manner similar or identical to that described with respect to the earlier processed item information representation, such as at block 808.

At block 1104, the apparatus includes means, such as one or more of the modules 202-216 and/or 302-310, to determine that the second scanned item data object comprises a second relevant item data object based on at least the target item data set associated with the item distribution route data, wherein the second relevant item data object corresponds to a second item representation. In some embodiments, while in a loading mode for example, the apparatus is configured to determine that the second scanned item data object comprises a second relevant item data object by determining the second scanned item data object corresponds to a second item data object in the target item data set. In this regard, the apparatus may determine that the second scanned item data object is relevant by comparing a second item data object identifier from the second scanned item data object with the identifiers for the item data objects in the target item data object set. Alternatively or additionally, in some embodiments, the apparatus may determine whether the second scanned item data object embodies or indicates a second delivery location that is represented in selected item distribution route data. In some embodiments, while in an unloading mode, the apparatus is configured to determine that the second scanned item data object comprises a second relevant item data object by determining the second scanned item data object corresponds to a second item data object in the target item data set associated with the device location. For example, the apparatus may determine that the second scanned item data object is relevant by comparing a second item data object identifier from the second scanned item data object with the identifiers for the item data objects in the target item data set associated with the device location. Alternatively or additionally, in some embodiments, the apparatus may determine whether the second scanned item data object embodies or includes a delivery location that matches the device location earlier identified.

At block 1106, the apparatus includes means, such as one or more of the modules 202-216 and/or 302-310, to generate a second augmented reality element corresponding to the second relevant item data object. In some embodiments, the apparatus generates the second augmented reality element based on a predefined augmented element template, for example such that the generated second augmented reality element matches the first, earlier generated augmented reality element. Additionally or alternatively, in some embodiments, the apparatus generates the augmented reality element based on one or more data values for the second relevant item data object. In some embodiments, for example, the second augmented reality element is based on a second delivery location for the second relevant item data object and/or item distribution route data, such as based on the number of stops before reaching the second delivery location or the second item, based on whether the second delivery location is earlier in the route or later in the route, based on a second position in a delivery vehicle the second item should be loaded, or the like. Additionally or alternatively still, in some embodiments, the second augmented reality element is generated to include one or more data values of the second relevant item data object, such as to include the second delivery location or sub-address therein (e.g., a second apartment or building number at a current location, which may be the same or different from a first apartment or building number for a first item), second recipient information, or the like.

At block 1108, the apparatus includes means, such as one or more of the modules 202-216 and/or 302-310, to cause rendering, to the user interface, of the captured image augmented based on at least the second augmented reality element, wherein the second augmented reality element is rendered based on a second item position associated with the second item representation corresponding to the second augmented reality element. The second augmented reality element may be rendered to the user interface together with one or more additional augmented reality elements, such as the earlier generated augmented reality element generated at block 812. In this regard, the user interface represents the augmented reality environment comprising the representations in the captured image together with the augmented reality element(s). The second augmented reality element may be positioned at the second item position such that the user may identify, from the second augmented reality element rendered at the second item position, that the second augmented reality element corresponds to the second item representation for a second relevant item. For example, in some embodiments, the augmented reality element is positioned at the location of the second item label, positioned at the location of a second visual indicia on the second item label, positioned such that the second augmented reality element is rendered on top of the second item label, or the like. Additionally or alternatively, in some embodiments, the second augmented reality element is rendered based on a second defined offset from the second item position, for example such that the second augmented reality element is rendered above the second item representation in the user interface.

FIG. 12 illustrates a flowchart including additional example operations of an example process 1200 for automatic item searching and verification, in accordance with at least one example embodiment of the present disclosure. Specifically, FIG. 12 illustrates an example process to provide an undetected item notification, for example in a circumstance where the apparatus detects the user failed to load a relevant item during a loading operation when the apparatus is in a loading mode. In this regard, the example process 1200 may be performed by one or more specially configured apparatuses, such as an imaging apparatus embodied by the apparatus 200 and/or a user device embodied by the apparatus 300. In some embodiments, the specially configured apparatus include and/or otherwise is in communication with one or more other apparatuses, systems, devices, and/or the like, to enable performance of one or more of the operations as depicted and described. For example, the apparatus 200 and/or apparatus 300 may be in communication with one or more remote server(s), and/or the apparatus may communicate with an imaging apparatus or user device to facilitate one or more image capture operations and/or image processing operations.

As illustrated, the example process 1200 begins at optional block 1202. In some embodiments, the block 1202 occurs after performance of one or more blocks of another process, such as the process 800. For example, as illustrated, block 1202 may begin after block 814 as depicted and described with respect to process 800. Alternatively or additionally, the process 1200 may end after block 1210, or in some other embodiments continues to one or more blocks of another process.

At optional block 1202, the apparatus includes means, such as one or more of the modules 202-216 and/or 302-310, to capture, using an imaging apparatus, a second captured image set comprising a second visual indicia set. In some such embodiments, the second captured image set may represent captured images for visual indicia corresponding to items loaded during a loading operation. The second captured image set may be captured at a closer range, such as in a circumstance where a user removes a relevant item from an unloaded item set for loading into a delivery vehicle and scans the item when removed from the item set. In some embodiments, the apparatus receives a captured image or captured image set from a separate device such an imaging apparatus. In some such embodiments, the apparatus does not capture or otherwise cause capture of the captured image data object or a captured image set, and may receive the captured image(s) based on action initiated via the imaging apparatus.

At block 1204, the apparatus includes means, such as one or more of the modules 202-216 and/or 302-310, to decode, from the visual indicia set, a second scanned item data set associated with the second visual indicia set, the second scanned item data set representing a loaded item data set. In this regard, the user may utilize the apparatus to process the visual indicia in each captured to indicate that the item has been loaded into the delivery vehicle. Additionally or alternatively, by decoding the visual indicia (e.g., to complete a scan of the visual indicia), the apparatus may initiate one or more processes associated with indicating the item has been loaded, such as to change a status for the corresponding item data object to indicate the item has been loaded for distribution. It should be appreciated that, in some embodiments, the captured images may be captured and subsequently processed one at a time (e.g., where the user captures a first image of a first item and that image is processed, then the user captures a second image of a second item and that image is processed, and so on), for example as the user loads items one at a time. In this regard, the user may initiate capture and processing of any number of images. In some embodiments, the user indicates the end of such capturing and processing in any of a myriad of ways, such as by interacting with a user interface element (e.g., a "done loading" button), initiating termination of an app executing via the apparatus, and/or based on determinations performed by the apparatus (e.g., after scanning a predetermined number of items).

At block 1206, the apparatus includes means, such as one or more of the modules 202-216 and/or 302-310, to identify, based on at least the scanned item data set, an undetected relevant item data object. In some embodiments, the undetected relevant item data object corresponds to an item data object that is not represented in the scanned item data set, but is expected to be loaded. For example, in at least one example embodiment, the undetected relevant item data object corresponds to an item data object in a target item data set that is not represented in the scanned item data set. In some such embodiments, the apparatus is configured to identify the undetected relevant item data object by comparing the scanned item data set with the target item data set to identify at least one item data object that does not correspond to a scanned item data object in the scanned item data set. In a circumstance where an item data object lacks corresponding data in the scanned item data set, the item data object represents the undetected relevant item data object. In at least one example context where the scanned item data set includes at least item data object identifiers, the apparatus compares each item data object identifier to the item data object identifiers for each item data object in the target item data set, and identifies at least one undetected relevant item data object having an item data object identifier not represented in the scanned item data set.

At block 1208, the apparatus includes means, such as one or more of the modules 202-216 and/or 302-310, to generate an undetected relevant item notification based on at least the undetected relevant item data object. In some embodiments, the undetected relevant item notification indicates that apparatus has not scanned (e.g., by capturing a visual indicia and successfully decoding the visual indicia) any visual indicia corresponding to the undetected relevant item data object. In some embodiments, the undetected relevant item notification includes text information indicating the undetected relevant item data object has not been detected. Alternatively or additionally, in some embodiments, the undetected relevant item notification includes one or more data values associated with the undetected relevant item data object, such as the item data object identifier, delivery location, recipient name, and/or the like.

At block 1210, the apparatus includes means, such as one or more of the modules 202-216 and/or 302-310, to cause rendering, to a user interface, of the undetected relevant item notification. In some embodiments, the undetected relevant item notification is rendered within an app executed by the apparatus. In other embodiments, the user interface is rendered via one or more external data channels. For example, the undetected item notification may be rendered via the user interface as a push notification via the apparatus, text message transmitted to the apparatus, and/or as an email transmitted to an account associated with the apparatus. In this regard, by rendering the undetected relevant item notification, the user may view the undetected relevant item notification to become aware of the undetected relevant item data object, and begin appropriate remedial action if applicable.

FIG. 13 illustrates a flowchart including additional example operations of an example process 1300 for automatic item searching and verification, in accordance with at least one example embodiment of the present disclosure. Specifically, FIG. 13 illustrates an example process to provide an improper scanned item notification, for example in a circumstance where the apparatus detects the user has scanned an improper item for loading during a loading operation when the apparatus is in a loading mode. In this regard, the example process 1300 may be performed by one or more specially configured apparatuses, such as an imaging apparatus embodied by the apparatus 200 and/or a user device embodied by the apparatus 300. In some embodiments, the specially configured apparatus include and/or otherwise is in communication with one or more other apparatuses, systems, devices, and/or the like, to enable performance of one or more of the operations as depicted and described. For example, the apparatus 200 and/or apparatus 300 may be in communication with one or more remote server(s), and/or the apparatus may communicate with an imaging apparatus or user device to facilitate one or more image capture operations and/or image processing operations.

As illustrated, the example process 1300 begins at optional block 1302. In some embodiments, the block 1302 occurs after performance of one or more blocks of another process, such as the process 800. For example, as illustrated, block 1302 may begin after block 814 as depicted and described with respect to process 800. Alternatively or additionally, the process 1300 may end after block 1310, or in some other embodiments continues to one or more blocks of another process.

At optional block 1302, the apparatus includes means, such as one or more of the modules 202-216 and/or 302-310, to capture, using an imaging apparatus, a second captured image set comprising a second visual indicia set. In some such embodiments, the second captured image set may represent captured images for visual indicia corresponding to items loaded during a loading operation. The second captured image set may be captured at a closer range, such as in a circumstance removes a relevant item for loading into a delivery vehicle. In some embodiments, the apparatus receives a second captured image or second captured image set from a separate device such as an imaging apparatus. In some such embodiments, the apparatus does not capture or otherwise cause capture of the second captured image data object or second captured image set, and may receive the second captured image(s) based on action initiated via the imaging apparatus.

At block 1304, the apparatus includes means, such as one or more of the modules 202-216 and/or 302-310, to decode, from the visual indicia set, a second scanned item data set associated with the second visual indicia set, the second scanned item data set representing a loaded item data set. In this regard, the user may utilize the apparatus to process the visual indicia in each captured to indicate that the item has been loaded into the delivery vehicle. Additionally or alternatively, by decoding the visual indicia (e.g., to complete a scan of the visual indicia), the apparatus may initiate one or more processes associated with indicating the item has been loaded, such as to change a status for the corresponding item data object to indicate the item has been loaded for distribution. It should be appreciated that, in some embodiments, the captured images may be captured and subsequently processed one at a time (e.g., where the user captures a first image of a first item and that image is processed, then the user captures a second image of a second item and that image is processed, and so on), for example as the user loads items one at a time. In this regard, the user may initiate capture and processing of any number of images.

At block 1306, the apparatus includes means, such as one or more of the modules 202-216 and/or 302-310, to detect, from the second scanned item data set, an improper item data object based on at least the target item data set. In some embodiments, the improper item data object corresponds to an item data object that is not to be loaded during a loading operation. For example, in at least one example embodiment, the improper item data object corresponds to an item data object that is not in the target item data object set, but has been scanned utilizing the apparatus to indicate the item is being loaded during a loading operation. In some such embodiments, the apparatus is configured to identify the improper item data object by comparing the scanned item data set with the target item data set to identify one item data object that is represented in the scanned item data set, but not in the target item data set. In at least one example context where the scanned item data set includes at least item data object identifiers, the apparatus compares each item data object identifier to the item data object identifiers for each item data object in the target item data set, and identifies at least one improper item data object having an item data object identifier not represented in the target item data set.

At block 1308, the apparatus includes means, such as one or more of the modules 202-216 and/or 302-310, to generate an improper scanned item notification based on at least the improper item data object. In this regard, in some embodiments, the undetected relevant item notification indicates that the apparatus has scanned (e.g., by capturing a visual indicia and successfully decoding the visual indicia) a visual indicia corresponding to the improper item that is not to be loaded for the selected item distribution route. In some embodiments, the improper scanned item notification includes text information indicating that an improper item has been scanned for loading. Alternatively or additionally, in some embodiments, the improper scanned item notification includes one or more data values associated with the improper item data object, such as the item data object identifier, a proper delivery location, recipient information, and/or the like.

At block 1310, the apparatus includes means, such as one or more of the modules 202-216 and/or 302-310, to cause rendering, to a user interface, of the improper scanned item notification. In some embodiments, the improper scanned item notification is rendered within an app executed by the apparatus. In other embodiments, the user interface is rendered via one or more external data channels. For example, the improper scanned item notification in some embodiments is rendered via the user interface as a push notification via the apparatus, text message transmitted to the apparatus, and/or as an email transmitted to an account associated with the apparatus. In this regard, by rendering the improper scanned item notification, the user may view the improper scanned item notification to become aware of the improperly scanned and/or loaded item, and begin appropriate remedial action if applicable.

FIG. 14 illustrates a flowchart including additional example operations of an example process 1400 for automatic item searching and verification, in accordance with at least one example embodiment of the present disclosure. The process 1400 in some embodiments occurs during an unload operation. In this regard, the example process 1400 may be performed by one or more specially configured apparatuses, such as an imaging apparatus embodied by the apparatus 200 and/or a user device embodied by the apparatus 300. In some embodiments, the specially configured apparatus include and/or otherwise is in communication with one or more other apparatuses, systems, devices, and/or the like, to enable performance of one or more of the operations as depicted and described. For example, the apparatus 200 and/or apparatus 300 may be in communication with one or more remote server(s), and/or the apparatus may communicate with an imaging apparatus or user device to facilitate one or more image capture operations and/or image processing operations.

As illustrated, the example process 1400 begins at optional block 1402. In some embodiments, the block 1402 occurs after performance of one or more blocks of another process, such as the process 800. For example, as illustrated, block 1402 may begin after block 814 as depicted and described with respect to process 800. Alternatively or additionally, the process 1400 may end after block 1410, or in some other embodiments continues to one or more blocks of another process.

At optional block 1402, the apparatus includes means, such as one or more of the modules 202-216 and/or 302-310, to capture, using an imaging apparatus, a second captured image set comprising a second visual indicia set. In some such embodiments, the second captured image set may represent captured images for visual indicia corresponding to items being unloaded during an unloading operation. The second captured image set may be captured at a closer range, such as in a circumstance where a user removes a relevant item from a delivery vehicle for delivery and scans the item. In some embodiments, the apparatus receives a second captured image or second captured image set from a separate device such as an imaging apparatus. In some such embodiments, the apparatus does not capture or otherwise cause capture of the second captured image data object or second captured image set, and may receive the second captured image(s) based on action initiated via the imaging apparatus.

At block 1404, the apparatus includes means, such as one or more of the modules 202-216 and/or 302-310, to decode, from the visual indicia set, a second scanned item data set associated with the second visual indicia set, the second scanned item data set representing an unloaded item data set. In this regard, the user may utilize the apparatus to process the visual indicia in each captured image to indicate that the item has been unloaded for delivery, such as from a delivery vehicle. Additionally or alternatively, by decoding the visual indicia (e.g., to complete a scan of the visual indicia), the apparatus may initiate one or more processes associated with indicating the item has been loaded, such as to change a status for the corresponding item data object to indicate the item has been unloaded and delivered. It should be appreciated that, in some embodiments, the captured images may be captured and subsequently processed one at a time (e.g., where the user captures a first image of a first item and that image is processed, then the user captures a second image of a second item and that image is processed, and so on), for example as the user unloads items one at a time. In this regard, the user may initiate capture and processing of any number of images. In some embodiments, the user indicates the end of such capturing and processing in any of a myriad of ways, such as by interacting with a user interface element (e.g., a "done unloading" button), initiating termination of an app executing via the apparatus, and/or based on determinations performed by the apparatus (e.g., after scanning a predetermined number of items).

At block 1406, the apparatus includes means, such as one or more of the modules 202-216 and/or 302-310, to identify, based on at least the scanned item data set, an improper unloaded item data object. In some embodiments, the improper unloaded item data object is not expected to be unloaded. For example, in at least one example embodiment, the improper unloaded item data object corresponds to an item data object that is not represented in a target item data set, but represented in the second scanned item data set. In a circumstance where an item data object lacks corresponding data in the target item data set, the item data object represents the improper unloaded item data object. In at least one example context where the scanned item data set includes at least item data object identifiers, the apparatus compares each item data object identifier to the item data object identifiers for each item data object in the target item data set, and identifies at least one improper unloaded item data object having an item data object identifier not represented in the second scanned item data set.

At block 1408, the apparatus includes means, such as one or more of the modules 202-216 and/or 302-310, to generate an improper unloaded item notification based on at least the improper unloaded item data object. In this regard, in some embodiments, the improper unloaded item notification indicates that the apparatus has scanned a visual indicia (e.g., by capturing a visual indicia and successfully decoding the visual indicia) for a removed item not to be unloaded at the current location. In some embodiments, the improper unloaded item notification includes text information indicating the improper unloaded item data object was improperly unloaded for example from a delivery vehicle. Alternatively or additionally, in some embodiments, the improper unloaded item notification includes one or more data values associated with the improper unloaded item data object, such as the item data object identifier, correct delivery location, and/or the like.

At block 1410, the apparatus includes means, such as one or more of the modules 202-216 and/or 302-310, to cause rendering, to a user interface, of the improper unloaded item notification. In some embodiments, the improper unloaded item notification is rendered within an app executed by the apparatus. In other embodiments, the user interface is rendered via one or more external data channels. For example, the improper unloaded item notification may be rendered via the user interface as a push notification via the apparatus, text message transmitted to the apparatus, and/or as an email transmitted to an account associated with the apparatus. In this regard, by rendering the improper unloaded item notification to become aware of the improper unloaded item data object, and begin appropriate remedial action if applicable (e.g., to return the item to the delivery vehicle).

FIG. 15 illustrates a flowchart including additional example operations of an example process 1500 for automatic item searching and verification, specifically detecting a missed item at a second location, in accordance with at least one example embodiment of the present disclosure. In at least one example context, the process 1500 occurs during an unload operation. In this regard, the example process 1500 may be performed by one or more specially configured apparatuses, such as an imaging apparatus embodied by the apparatus 200 and/or a user device embodied by the apparatus 300. In some embodiments, the specially configured apparatus include and/or otherwise is in communication with one or more other apparatuses, systems, devices, and/or the like, to enable performance of one or more of the operations as depicted and described. For example, the apparatus 200 and/or apparatus 300 may be in communication with one or more remote server(s), and/or the apparatus may communicate with an imaging apparatus or user device to facilitate one or more image capture operations and/or image processing operations.

As illustrated, the example process 1500 begins at block 1502. In some embodiments, the block 1502 occurs after performance of one or more blocks of another process, such as the process 800. For example, as illustrated, block 1502 may begin after block 814 as depicted and described with respect to process 800. Alternatively or additionally, the process 1500 may end after block 1514, or in some other embodiments continues to one or more blocks of another process.

At block 1502, the apparatus includes means, such as one or more of the modules 202-216 and/or 302-310, to identify a second device location, wherein the second device location is associated with at least a second portion of the item distribution route data. In this regard, the second device location may correspond to a second delivery location represented in the item distribution route data. The apparatus (and/or the user) may have repositioned to the second device location by progressing along the item distribution route, for example during package delivery to a plurality of locations. In this regard, the second device location may represent a second stop that is after one or more previous stops in a sequential order of locations represented by the item distribution route data. In some embodiments, the apparatus is configured to receive user input indicating the user has progressed from a first device location to a subsequent location indicated in the item distribution route data (e.g., a second delivery stop).

At block 1504, the apparatus includes means, such as one or more of the modules 202-216 and/or 302-310, to retrieve a second target item data set based on at least the item distribution route data and the second device location. In this regard, in some embodiments, the second target item data set embodies a data set representing a second item set to be unloaded at the second device location (e.g., a second unload item set). In some embodiments, the item distribution route data includes item data object(s) and/or identifiers for the items to be delivered at each location, such that the item data objects to be distributed at the second device location are identifiable. In some embodiments, one or more APIs are utilized to identify the second target item data set for the second device location.

At block 1506, the apparatus includes means, such as one or more of the modules 202-216 and/or 302-310, to capture, using an imaging apparatus, a second captured image comprising a second item representation set and a second item information representation set associated with the second item representation set. In some embodiments, the captured image is one of a captured image set captured by the apparatus, such as using an imaging apparatus. For example, in at least one example embodiment, the apparatus utilizes one or a plurality of imagers (e.g., embodying the imaging apparatus) to capture the image and/or captured image set, and/or to determine the image including one or more item information representations and/or item representations best in focus for further processing. In some embodiments, the apparatus receives a second captured image or second captured image set from a separate device such as an imaging apparatus. In some such embodiments, the apparatus does not capture or otherwise cause capture of the second captured image data object or second captured image set, and may receive the second captured image(s) based on action initiated via the imaging apparatus.

In some embodiments, the apparatus is configured to detect each item representation and/or the associated item information representation, and/or one or more sub-elements of the item information representation, from the captured image. In some embodiments, for example where the item information representation comprises an item label representation, the apparatus may detect the item label and/or specific text elements thereon, such as an identifier and/or delivery location on the label, and utilize OCR or other image processing methodologies to identify such image data for further processing. In other embodiments, for example where the item information representation embodies a visual indicia, the apparatus is configured to detect the visual indicia (such as on the item label) for further processing by decoding the visual indicia. In this regard, the captured image may include an item representation and/or item information representation for each item within the field of view of the imaging apparatus during the capture operation.

The augmented reality environment is maintained by the apparatus for purposes of enabling rendering of augmented reality elements together with captured images, such that resulting user interfaces may be provided representing the augmented reality for viewing by the user at the second location. In some embodiments, the apparatus configures the augmented reality environment at an earlier step (e.g., upon initialization of the apparatus and/or launch of a corresponding app). The apparatus may process the captured image to identify item positions associated with the various representations for purposes of positioning augmented reality elements within the augmented reality environment, for example for purposes of positioning information to be rendered on top of or otherwise in a position associated with a particular item representation. It should be appreciated that the apparatus may maintain a second augmented reality environment separate from the augmented reality environment earlier maintained for a first device location.

In some embodiments, the apparatus receives at least the captured image from the imaging apparatus. For example, the apparatus may receive the captured image over one or more communications networks (e.g., over a Bluetooth connection, wireless LAN or Internet connection, and/or the like). In some such embodiments, the imaging apparatus may be configured merely for image capture, and the apparatus separate from the imaging apparatus configured for processing such images. In this regard, the imaging apparatus may be constructed with minimal processing hardware relative to the processing apparatus. In other embodiments, the imaging apparatus is configured for both capture and processing, and in this regard may perform all operations of the process 1500 via the single apparatus.

At block 1508, the apparatus includes means, such as one or more of the modules 202-216 and/or 302-310, to identify, from a second item information representation of the second item information representation set, a second scanned item data object corresponding to a second item representation associated with the second item information representation. In some embodiments, the apparatus is configured to extract text elements from the second item information representation, for example using OCR and/or other image processing methodologies, to identify the scanned item data object from the data rendered on an item label. In this regard, such data may include one or more data values of a corresponding item data object. Additionally or alternatively, in some embodiments, the apparatus extracts an item data object identifier from the item information representation and utilizes the item data object identifier to identify the second scanned item data object, for example by requesting the second scanned item data object corresponding to the item data object identifier and receiving the second scanned item data object in response to the request.

Additionally or alternatively, in at least some embodiments, the second item information representation embodies or includes a second visual indicia, and the apparatus is configured to decode the second visual indicia to identify the second scanned item data object. For example, in some embodiments, the second visual indicia encodes the second scanned item data object embodying some or all of the corresponding second item data object for the second item corresponding to the second item information representation. The second visual indicia may encode, in some embodiments, a second item data object identifier, a second delivery location, second delivery recipient, and/or the like for the second item. In this regard, in some embodiments, the apparatus decodes the visual indicia to identify the visual indicia to identify the second scanned item data object directly. Additionally or alternatively in some embodiments, the apparatus decodes the second visual indicia to identify a second item data object identifier that may be used to identify the second scanned item data object embodying the second item data object corresponding to the second visual indicia, such as by utilizing the second item data object identifier to retrieve the second scanned item data object from a local datastore and/or remote server.

In some embodiments, the second scanned item data object represents a second item data object for items currently loaded on a delivery vehicle at a second device location. In this regard, the captured images will include representations for items that remain loaded on a delivery vehicle, for example, and not those that have been unloaded such as at one or more previously visited locations.

At block 1510, the apparatus includes means, such as one or more of the modules 202-216 and/or 302-310, to identify the second scanned item data object comprises a missed item data object associated with a first device location. In this regard, in at least one example context, the missed item data object corresponds to an item that should have been unloaded at the first device location when previously visited, but was not properly unloaded (for example, the item remains in the delivery vehicle even though a second stop in a sequential item distribution route was reached). In some embodiments, the apparatus identifies a missed item data object by identifying the second scanned item data object corresponds to a delivery location that was already visited and/or otherwise earlier in a sequential item distribution route. In some such embodiments, the apparatus may be configured to determine the delivery location for the second scanned item data object corresponds to an already visited and/or sequentially previous delivery location based on the identified item distribution route data. For example, in an example context where the item distribution route data embodies a sequential list of delivery locations, the apparatus may identify that the second device location (e.g., a current location) corresponds to a second stop, but the delivery location corresponding to and/or represented in the second scanned item data object corresponds to a first delivery location earlier in the sequential set of locations. In some embodiments, the apparatus tracks and/or otherwise determines previously visited locations so as to identify whether a delivery location for scanned item data object corresponds to a previously visited location. In this regard, in a circumstance where the apparatus identifies the second scanned item data object corresponds to an earlier location, the apparatus determines the second scanned item data object represents a missed item data object.

At block 1512, the apparatus includes means, such as one or more of the modules 202-216 and/or 302-310, to generate a missed item notification based on at least the missed item data object associated with the first device location. In this regard, in some embodiments, the missed item notification indicates the apparatus has scanned (e.g., by capturing a visual indicia and successfully decoding the visual indicia) a visual indicia corresponding to the missed item to be delivered at the first device location. In some embodiments, the missed item notification includes text information indicating that a missed item has been detected in the current item set. Alternatively or additionally, in some embodiments, the missed item notification includes one or more data values associated with the missed item data object, such as the item data object identifier, a proper delivery location (e.g., the first device location), recipient information, and/or the like.

At block 1514, the apparatus includes means, such as one or more of the modules 202-216 and/or 302-310, to cause rendering, to a user interface, of the missed item notification. In some embodiments, the missed item notification is rendered within an app executed by the apparatus. In other embodiments, the user interface is rendered via one or more external data channels. For example, in some embodiments, the missed item notification is rendered via the user interface as a push notification via the apparatus, text message transmitted to the apparatus, and/or as an email transmitted to an account associated with the apparatus. In this regard, by rendering the missed item notification, the user may view the missed item notification to become aware of the missed item, and begin appropriate remedial action if applicable.

In some embodiments, the apparatus is configured to render the missed item notification via an augmented reality element corresponding to the missed item data object. In some embodiments, the apparatus generates the augmented reality element based on a predefined augmented element template, for example such that the generated augmented reality element matches all other augmented reality elements for missed items. Additionally or alternatively, in some embodiments, the apparatus generates the augmented reality element based on one or more data values for the missed item data object. For example, in at least one example embodiment, the apparatus generates the augmented reality element based on an appropriate delivery location for the missed item data object, or a correct stop number for the missed item data object based on the item distribution route data. In some embodiments, the augmented reality element is generated as a color distinct from other augmented reality elements generated for proper, relevant item data objects (e.g., those appropriate for unloading at the second device location), or utilizing another visual effect to visually distinguish the augmented reality element(s) for missed item data object(s).

In some such embodiments, the apparatus causes rendering, to a user interface, of the captured image augmented based on at least the augmented reality element for the missed item data object. For example, the augmented reality element for the missed item may be rendered based on an item position in an augmented reality environment associated with the corresponding item representation and/or item information representation. In some such embodiments, the apparatus may render the augmented reality element for the missed item data object together with other augmented reality elements, such as those appropriate for unloading at the second device location. In some such embodiments, the apparatus is configured to maintain the augmented reality environment and/or generated augmented reality elements, for example such that the augmented reality element for the missed item data object remains appropriately rendered in a position such that the user may visually associate the augmented reality element with the item representation for the missed item. The augmented reality environment may be maintained even as the use moves, repositions the apparatus, and/or the like.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. Additionally or alternatively, in some implementations, the information processing apparatus includes specially configured hardware, software, and/or firmware to enable image capture and/or processing, such as a plurality of imagers, activation circuitry, and/or image processing circuitry. The apparatus and execution environment can realize various different computing model infrastructures, such as a local apparatus and/or computing device, one or more servers, web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network. Such computers may include, in some implementations, handheld computing devices, mobile devices, image scanners (e.g., barcode scanners), and/or the like.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus for automatic item searching and verification, the apparatus comprising at least one processor and at least one non-transitory memory including computer-coded instructions thereon, the computer-coded instructions, with the at least one processor, configure the apparatus to:
   retrieve a target item data set associated with item distribution route data;
   receive a captured image comprising an item representation set and an item information representation set associated with the item representation set,
   wherein each item representation of the item representation set is associated with an item position in an augmented reality environment;
   identify, from an item information representation of the item information representation set, a scanned item data object corresponding to the item information representation;
   determine that the scanned item data object comprises a relevant item data object based on at least the target item data set;
   generate an augmented reality element corresponding to the relevant item data object;
   cause rendering, to a user interface, of the captured image augmented based on at least the augmented reality element,
   wherein the augmented reality element is rendered based on at least a first item position associated with an item representation corresponding to the augmented reality element;
   capture, using an imaging apparatus, a second captured image set comprising a second visual indicia set;
   decode, from the second visual indicia set, a second scanned item data set associated with the second visual indicia set, the second scanned item data set representing a loaded item data set;
   identify, based on at least the second scanned item data set, an undetected relevant item data object;
   generate an undetected relevant item notification based on at least the undetected relevant item data object; and
   cause rendering, to the user interface, of the undetected relevant item notification.

2. The apparatus according to claim 1, wherein to receive the captured image, the apparatus is configured to:
   capture at least the captured image using the imaging apparatus.

3. The apparatus according to claim 1, the apparatus further configured to:
   identify, from a second item information representation of the item information representation set, a second scanned item data object corresponding to a second item representation associated with the second item information representation;
   identify the second scanned item data object comprises a second relevant item data object based on at least the target item data set associated with the item distribution route data, wherein the second relevant item data object corresponds to the second item representation;
   generate a second augmented reality element corresponding to the second relevant item data object; and
   cause rendering, to the user interface, of the captured image augmented based on at least the second augmented reality element, wherein the second augmented reality element is rendered based on a second item position associated with the second item representation corresponding to the second augmented reality element.

4. The apparatus according to claim 1, wherein to identify the scanned item data object corresponding to the item information representation, the apparatus is configured to:
   detect visual indicia in the captured image; and
   decode the visual indicia to identify the scanned item data object.

5. The apparatus according to claim 1, wherein to identify the scanned item data object corresponding to the item information representation, the apparatus is configured to:
   detect an item label in the captured image; and
   extract, using an optical character recognition image processing algorithm, the scanned item data object.

6. The apparatus according to claim 1, the apparatus further configured to:
   detect, from the second scanned item data set, an improper item data object based on at least the target item data set;
   generate an improper scanned item notification based on at least the improper item data object; and
   cause rendering, to the user interface, of the improper scanned item notification.

7. The apparatus according to claim 1, the apparatus further configured to:
   identify a device location, wherein the apparatus is configured to retrieve the target item data set based on at least the device location.

8. The apparatus according to claim 1, the apparatus further configured to:
   identify a device location, wherein the device location is associated with at least a portion of the item distribution route data;
   retrieve a second target item data set based on the item distribution route data and the device location, the second target item data set representing a target unload data set;
   capture, using the imaging apparatus, a second captured image comprising a second item representation set and a second item information representation set associated with the second item representation set,
   wherein each item representation in the second item representation set is associated with a second item position in a second augmented reality environment;
   identify, from a second item information representation of the item information representation set, a second scanned item data object corresponding to the second item information representation;
   identify the second scanned item data object comprises a second relevant item data object based on at least the second target item data set;
   generate a second augmented reality element corresponding to the second relevant item data object; and
   cause rendering, to the user interface, the second captured image augmented based on at least the second augmented reality element, wherein the second augmented reality element is rendered based on the second item position associated with a second item representation corresponding to the second augmented reality element.

9. The apparatus according to claim 1, the apparatus further configured to:

detect, from the second scanned item data set, an improper item data object based on the target item data set;

generate an improper scanned item notification based on at least the improper item data object; and cause rendering, to the user interface, of the improper scanned item notification.

10. The apparatus according to claim 1, the apparatus further configured to:

identify, based on at least the second scanned item data set, an improper unloaded item data object;

generate an improper unloaded item notification based on at least the improper unloaded item data object; and cause rendering, to the user interface, of the improper unloaded item notification.

11. The apparatus according to claim 1, wherein the target item data set comprises a first target item data set associated with a first device location, and the apparatus further configured to:

identify a second device location, wherein the second device location is associated with at least a second portion of the item distribution route data;

retrieve a second target item data set based on at least the item distribution route data and the second device location;

capture, using the imaging apparatus, a second captured image comprising a second item representation set and a second item information representation set associated with the second item representation set;

identify, from a second item information representation of the second item information representation set, a second scanned item data object corresponding to a second item representation associated with the second item information representation;

identify the second scanned item data object comprises a missed item data object associated with the first device location;

generate a missed item notification based on at least the missed item data object associated with the first device location; and cause rendering, to the user interface, of the missed item notification.

12. The apparatus according to claim 1, wherein the target item data set is retrieved from a remote server over a first communications network via at least one application programming interface.

13. The apparatus according to claim 1, wherein to receive the captured image, the apparatus is configured to capture the captured image using a multi-imager imaging apparatus.

14. A computer-implemented method for automatic item searching and verification, the computer-implemented method comprising:

retrieving a target item data set associated with item distribution route data;

receiving a captured image comprising an item representation set and an item information representation set associated with the item representation set, wherein each item representation of the item representation set is associated with an item position in an augmented reality environment;

identifying, from an item information representation of the item information representation set, a scanned item data object corresponding to the item information representation;

determining that the scanned item data object comprises a relevant item data object based on at least the target item data set;

generating an augmented reality element corresponding to the relevant item data object;

causing rendering, to a user interface, of the captured image augmented based on at least the augmented reality element, wherein the augmented reality element is rendered based on at least a first item position associated with an item representation corresponding to the augmented reality element;

capturing, using an imaging apparatus, a second captured image set comprising a second visual indicia set;

decoding, from the second visual indicia set, a second scanned item data set associated with the second visual indicia set, the second scanned item data set representing a loaded item data set;

identifying, based on at least the second scanned item data set, an undetected relevant item data object;

generating an undetected relevant item notification based on at least the undetected relevant item data object; and causing rendering, to the user interface, of the undetected relevant item notification.

15. The computer-implemented method according to claim 14, the computer-implemented method further comprising:

identifying, from a second item information representation of the item information representation set, a second scanned item data object corresponding to a second item representation associated with the second item information representation;

identifying the second scanned item data object comprises a second relevant item data object based on at least the target item data set associated with the item distribution route data, wherein the second relevant item data object corresponds to the second item representation;

generating a second augmented reality element corresponding to the second relevant item data object; and causing rendering, to the user interface, of the captured image augmented based on at least the second augmented reality element, wherein the second augmented reality element is rendered based on a second item position associated with the second item representation corresponding to the second augmented reality element.

16. The computer-implemented method according to claim 14, wherein identifying the scanned item data object corresponding to the item information representation comprises:

detecting an item label in the captured image; and extracting, using an optical character recognition image processing algorithm, the scanned item data object.

17. The computer-implemented method according to claim 14, the computer-implemented method further comprising:

identifying a device location, wherein retrieving the target item data set is based on at least the device location.

18. The computer-implemented method according to claim 14, wherein receiving the captured image comprises capturing the captured image using a multi-imager imaging apparatus.

19. A computer program product for automatic item searching and verification, the computer program product comprising a non-transitory computer-readable storage medium having computer program code stored thereon, the computer program code in execution with at least one processor configured for:

retrieving a target item data set associated with item distribution route data;

receiving a captured image comprising an item representation set and an item information representation set associated with the item representation set, wherein each item representation of the item representation set is associated with an item position in an augmented reality environment;

identifying, from an item information representation of the item information representation set, a scanned item data object corresponding to the item information representation;

determining that the scanned item data object comprises a relevant item data object based on at least the target item data set;

generating an augmented reality element corresponding to the relevant item data object;

causing rendering, to a user interface, of the captured image augmented based on at least the augmented reality element, wherein the augmented reality element is rendered based on at least a first item position associated with an item representation corresponding to the augmented reality element;

capturing, using an imaging apparatus, a second captured image set comprising a second visual indicia set;

decoding, from the second visual indicia set, a second scanned item data set associated with the second visual indicia set, the second scanned item data set representing a loaded item data set;

identifying, based on at least the second scanned item data set, an undetected relevant item data object;

generate an undetected relevant item notification based on at least the undetected relevant item data object; and cause rendering, to the user interface, of the undetected relevant item notification.

* * * * *